US012464563B2

(12) United States Patent
Cherian et al.

(10) Patent No.: US 12,464,563 B2
(45) Date of Patent: Nov. 4, 2025

(54) UPLINK (UL) AGGREGATION FOR MULTI-LINK OPERATION (MLO)

(71) Applicant: QUALCOMM Incorporated, San Diego, CA (US)

(72) Inventors: George Cherian, San Diego, CA (US); Abhishek Pramod Patil, San Diego, CA (US); Sai Yiu Duncan Ho, San Diego, CA (US); Alfred Asterjadhi, San Diego, CA (US); Yanjun Sun, San Diego, CA (US); Guido Robert Frederiks, Watsonville, CA (US); Maarten Menzo Wentink, Nijmegen (NL); Raja Banerjea, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/188,723

(22) Filed: Mar. 1, 2021

(65) Prior Publication Data
US 2021/0282186 A1 Sep. 9, 2021

Related U.S. Application Data

(60) Provisional application No. 63/008,413, filed on Apr. 10, 2020, provisional application No. 62/985,212, filed on Mar. 4, 2020.

(51) Int. Cl.
*H04W 74/08* (2024.01)
*H04W 74/00* (2009.01)
*H04W 74/0816* (2024.01)

(52) U.S. Cl.
CPC ..... *H04W 74/0816* (2013.01); *H04W 74/002* (2013.01); *H04W 74/006* (2013.01)

(58) Field of Classification Search
CPC ............. H04W 74/006; H04W 74/008; H04W 74/0816; H04W 84/12
See application file for complete search history.

(56) References Cited

U.S. PATENT DOCUMENTS

| 2017/0118770 A1 | 4/2017 | Cherian et al. |
| 2018/0310340 A1 | 10/2018 | Noh et al. |

(Continued)

FOREIGN PATENT DOCUMENTS

| CN | 109314997 A | 2/2019 |
| TW | I495379 B | 8/2015 |

(Continued)

OTHER PUBLICATIONS

Translation of KR-10-2019-0136862 (pp. 38-40). 2019 (Year: 2019).*

(Continued)

*Primary Examiner* — Liton Miah
(74) *Attorney, Agent, or Firm* — ArentFox Schiff LLP

(57) ABSTRACT

This disclosure provides methods, devices and systems for transmitting and receiving physical protocol data units (PPDUs) over multiple links. In some aspects, a wireless communication device may determine that first random back off (RBO) for a first channel of a first link has counted down to zero. A wireless communication device may determine, when the first RBO has counted down to zero, that a second RBO for a second channel of a second link has a count down remaining. A wireless communication device may optionally transmit a medium reservation message on the first link reserving a transmission opportunity (TXOP). A wireless communication device may determine whether to wait for the second RBO before transmitting on the first link. A wireless communication device may transmit at least a first PPDU on the first link during the TXOP.

25 Claims, 14 Drawing Sheets

SYNC PPDU with count-down on both links (no PIFS)

(56) References Cited

U.S. PATENT DOCUMENTS

| | | | |
|---|---|---|---|
| 2020/0008200 A1 | 1/2020 | Viger et al. | |
| 2020/0037324 A1* | 1/2020 | Chu | H04L 1/0057 |
| 2020/0045703 A1 | 2/2020 | Ryu et al. | |
| 2020/0314920 A1* | 10/2020 | Seok | H04W 74/0808 |
| 2020/0404680 A1* | 12/2020 | Chu | H04L 27/2602 |
| 2021/0068184 A1* | 3/2021 | Chu | H04W 80/08 |
| 2021/0127420 A1* | 4/2021 | Lu | H04W 74/0808 |
| 2021/0212118 A1* | 7/2021 | Lu | H04W 74/0816 |
| 2021/0235486 A1* | 7/2021 | Atefi | H04W 74/002 |
| 2022/0394759 A1* | 12/2022 | Jang | H04W 74/0808 |

FOREIGN PATENT DOCUMENTS

| | | |
|---|---|---|
| TW | 201924429 A | 6/2019 |
| WO | 2020027634 A1 | 2/2020 |

OTHER PUBLICATIONS

International Search Report and Written Opinion—PCT/US2021/020498—ISAEPO—Jul. 2, 2021.

Wisnu Murti (Seoul Tech): "Performance and Fairness of Multi-link Operations", IEEE Draft, IEEE 802.11-19/1633r1, 11-19-1633-01-00BE-Performance-and-Fairness-of-Multi-Link-Operations, IEEE-SA Mentor, Piscataway, NJ USA, vol. 802.11 EHT, 802.11be, No. 1, Nov. 12, 2019 (Nov. 12, 2019), XP068164547, pp. 1-19, Retrieved from the Internet: URL:https://mentor.ieee.org/802.11/dcn/19/11-19-1633-01-00be-performance-and-fairness-of-multi-link-operations.pptx [retrieved on Nov. 12, 2019] p. 6-p. 9.

Naribole (Samsung) S., et al., "Multi-link Channel Access Discussion", 11-19-1405-07-00BE-Multi-Link-Operation-Channel-Access-Discussion, Oct. 31, 2019, doc.: IEEE 802.11-19/1405r7, Nov. 2019, pp. 1-18.

Naribole (Samsung) S., et al., "Multi-link TXOP Aggregation Considerations", 11-19-1505-02-00BE-Multi-Link-Aggregation-Consideration, Oct. 31, 2019, doc.: IEEE 802.11-19/1505r2, Sep. 2019, pp. 1-8.

Seok (Mediatek) Y., et al., "Multi-Link Operation Simulation Methodology", 11-19-1927-00-00BE-Multi-Link-Operation-Simulation-Methodology, Nov. 9, 2019, doc.: IEEE 802.11-19/1927r0, pp. 1-16.

Taiwan Search Report—TW110107273—TIPO—Jun. 12, 2024.

\* cited by examiner

1300

1302
Advertise a first EDCA set including first EDCA parameters for a first link 1304
Advertise a second EDCA set including second EDCA parameters for a second link 1306
Receive a medium reservation message on the first link reserving a TXOP for a station 1308
Receive a first PPDU on the first link during the TXOP 1310
Receive a second PPDU on the second link during the TXOP

*Figure 13*

UPLINK (UL) AGGREGATION FOR MULTI-LINK OPERATION (MLO)

CROSS REFERENCE TO RELATED APPLICATIONS

This application claims priority to U.S. Provisional Application No. 62/985,212 titled "UPLINK (UL) AGGREGATION FOR MULTI-LINK OPERATION (MLO)," filed Mar. 4, 2020 and U.S. Provisional Application No. 63/008,413 titled "UPLINK (UL) AGGREGATION FOR MULTI-LINK OPERATION (MLO)," filed Apr. 10, 2020, both of which are assigned to the assignee hereof, and incorporated herein by reference in their entirety.

TECHNICAL FIELD

This disclosure relates generally to wireless communication, and more specifically, to aggregation of uplink transmissions in multi-link operation (MLO).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes determining that first random back off (RBO) for a first channel of a first link has counted down to zero. The method further includes determining, when the first RBO has counted down to zero, that a second RBO for a second channel of a second link has a count down remaining. Additionally, the method further includes determining whether to wait for the second RBO before transmitting on the first link. Additionally, the method further includes transmitting at least a first physical protocol data unit (PPDU) on the first link during a transmission opportunity (TXOP) that starts when the first RBO has counted down to zero.

Another innovative aspect of the subject matter described in this disclosure can be implemented in a wireless communication device. The wireless communication device includes at least one modem; at least one processor communicatively coupled with the at least one modem; and at least one memory communicatively coupled with the at least one processor and storing processor-readable code. When the processor-readable code is executed by the at least one processor in conjunction with the at least one modem, the wireless communication device is configured to determine that first RBO for a first channel of a first link has counted down to zero. The wireless communication device is further configured to determine, when the first RBO has counted down to zero, that a second RBO for a second channel of a second link has a count down remaining. Additionally, the wireless communication device is further configured to determine whether to wait for the second RBO before transmitting on the first link. Additionally, the wireless communication device is further configured to transmit at least a first PPDU on the first link during the TXOP.

Another innovative aspect of the subject matter described in this disclosure can be implemented in an apparatus for wireless communication by a wireless communication device, including means for determining that first RBO for a first channel of a first link with an access point has counted down to zero. The apparatus further includes means for determining, when the first RBO has counted down to zero, that a second RBO for a second channel of a second link has a count down remaining. Additionally, the apparatus further includes means for transmitting a medium reservation message on the first link reserving a TXOP. Additionally, the apparatus further includes means for determining whether to wait for the second RBO before transmitting on the first link. Additionally, the apparatus further includes means for transmitting at least a first PPDU on the first link during the TXOP.

Another innovative aspect of the subject matter described in this disclosure can be implemented in a computer-readable medium including stored instructions for wireless communication by a wireless communication device, executable by a processor to determine that first RBO for a first channel of a first link has counted down to zero. The instructions are further executable to determine, when the first RBO has counted down to zero, that a second RBO for a second channel of a second link has a count down remaining. Additionally, the instructions are further executable to transmit a medium reservation message on the first link reserving a TXOP. Additionally, the instructions are further executable to determine whether to wait for the second RBO before transmitting on the first link. Additionally, the instructions are further executable to transmit at least a first PPDU on the first link during the TXOP.

In some implementations, the methods and wireless communication devices may be configured to determine that the second RBO has counted down to zero in response to determining to wait for the second RBO; and transmit a second PPDU on the second link. A start time and an end time of the first PPDU and the second PPDU are aligned.

In some implementations, the methods and wireless communication devices may be configured to transmit a medium reservation message on the first link reserving the TXOP.

In some implementations, the medium reservation message is one of a clear to send to self (CTS2Self) message or a modified request to send (RTS) message.

In some implementations of the methods and wireless communication devices, determining whether to wait for the second RBO before transmitting on the first link includes determining to transmit the first PPDU without waiting in response to determining that the second RBO is greater than a threshold.

In some implementations of the methods and wireless communication devices, determining whether to wait for the second RBO before transmitting on the first link includes determining to transmit the first PPDU without waiting in response to determining that the second channel is blocked by a network allocation vector (NAV).

In some implementations of the methods and wireless communication devices, the medium reservation message interrupts the second RBO for the second link. The methods and wireless communication devices may be configured to resume the second RBO after the medium reservation message.

In some implementations of the methods and wireless communication devices, determining whether to wait for the second RBO before transmitting on the first link is based on a probability of accessing the second link and an idle period on the first link between the medium reservation message and an expected availability of the second link.

In some implementations of the methods and wireless communication devices, determining whether to wait for the second RBO before transmitting on the first link includes: determining to wait for the second RBO before transmitting on the first link; and determining to transmit on the first link without waiting in response to determining that the second link is blocked. Determining that the second link is blocked may include determining that a waiting time has expired.

In some implementations of the methods and wireless communication devices, an access point refrains from transmitting a downlink PPDU on the second link during the TXOP in response to the medium reservation message.

In some implementations of the methods and wireless communication devices, an access point for the second link advertises an enhanced distributed channel access (EDCA) set including second-phase EDCA parameters. The methods and wireless communication devices may be configured to adjust the second RBO based on the second-phase EDCA parameters in response to transmitting the medium reservation message.

In some implementations of the methods and wireless communication devices, the first RBO and the second RBO are initialized with a same value.

In some implementations, the methods and wireless communication devices may be configured to determine that the count down remaining of the second RBO is less than a threshold; and set the count down remaining of the second RBO to zero.

In some implementations, the methods and wireless communication devices may be configured to select a new RBO for the second channel of the second link; and increase the new RBO based on a residual value of the second RBO.

In some implementations, increasing the new RBO based on the residual value of the second RBO includes increasing the new RBO by the residual value multiplied by a configurable weighting factor.

In some implementations, the methods and wireless communication devices may be configured to add an offset to the first RBO and to the second RBO based on a configurable weighting factor. Transmitting at least the first PPDU on the first link during the TXOP may include transmitting the first PPDU on the first link and transmitting a second PPDU on the second link in response to determining that either the first RBO or the second RBO has counted down to zero. A start time and an end time of the first PPDU and the second PPDU may be aligned.

In some implementations of the methods and wireless communication devices, determining whether to wait for the second RBO before transmitting on the first link includes: determining to wait for the second RBO before transmitting on the first link; resetting the first RBO in response to another device using the first channel; and waiting for the first RBO and the second RBO to count down to zero. In some implementations, resetting the first RBO includes setting a value of the first RBO based on the count down remaining of the second RBO.

Another innovative aspect of the subject matter described in this disclosure can be implemented in a method for wireless communication. The method includes advertising a first enhanced distributed channel access (EDCA) set including first EDCA parameters for a first link. The method includes advertising a second EDCA set including second EDCA parameters for a second link. The method includes receiving a first physical protocol data unit (PPDU) from a station on the first link during the TXOP. The method includes receiving a second PPDU from the station on the second link during the TXOP. A start time and an end time of the first PPDU and the second PPDU are aligned.

Another innovative aspect of the subject matter described in this disclosure can be implemented in a wireless access point. The wireless access point includes at least one modem; at least one processor communicatively coupled with the at least one modem; and at least one memory communicatively coupled with the at least one processor and storing processor-readable code. When the processor-readable code is executed by the at least one processor in conjunction with the at least one modem, the wireless access point is configured to. The processor is configured to advertise a first EDCA set including first EDCA parameters for a first link. The wireless access point is configured to advertise a second EDCA set including second EDCA parameters for a second link. The wireless access point is configured to receive a first PPDU from a station on the first link during the TXOP. The wireless access point is configured to receive a second PPDU from the station on the second link during the TXOP. A start time and an end time of the first PPDU and the second PPDU are aligned.

Another innovative aspect of the subject matter described in this disclosure can be implemented in an apparatus for wireless communication by a wireless communication device, including means for advertising a first EDCA set including first EDCA parameters for a first link. The apparatus includes means for advertising a second EDCA set including second EDCA parameters for a second link. The apparatus includes means for receiving a first PPDU from a station on the first link during the TXOP. The apparatus includes means for receiving a second PPDU from the station on the second link during the TXOP. A start time and an end time of the first PPDU and the second PPDU are aligned.

Another innovative aspect of the subject matter described in this disclosure can be implemented in a computer-readable medium including stored instructions for wireless communication by a wireless communication device, executable by a processor to advertise a first EDCA set including first EDCA parameters for a first link. The instructions are further executable to advertise a second EDCA set including second EDCA parameters for a second link. The instructions are further executable to receive a first PPDU from a station on the first link during the TXOP. The instructions are further executable to receive a second PPDU from the station on the second link during the TXOP. A start time and an end time of the first PPDU and the second PPDU are aligned.

In some implementations, the methods and wireless communication devices may be configured to receive a medium reservation message on the first link reserving the TXOP for the station.

In some implementations, the medium reservation message is one of a CTS2Self message or a modified RTS message.

In some implementations, the methods and wireless communication devices may be configured to refrain from transmitting a downlink PPDU on the second link during the TXOP in response to the medium reservation message.

In some implementations, the second EDCA set includes first phase EDCA parameters to be used when a station has not grasped another channel and second-phase EDCA parameters to be used when the station has grasped another channel, and a random back off (RBO) range for the second-phase EDCA parameters includes values less than a RBO range for the first-phase EDCA parameters.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 13 shows a flowchart illustrating an example process for receiving PPDUs on multiple links.

Like reference numbers and designations in the various drawings indicate like elements.

DETAILED DESCRIPTION

Figure 1:
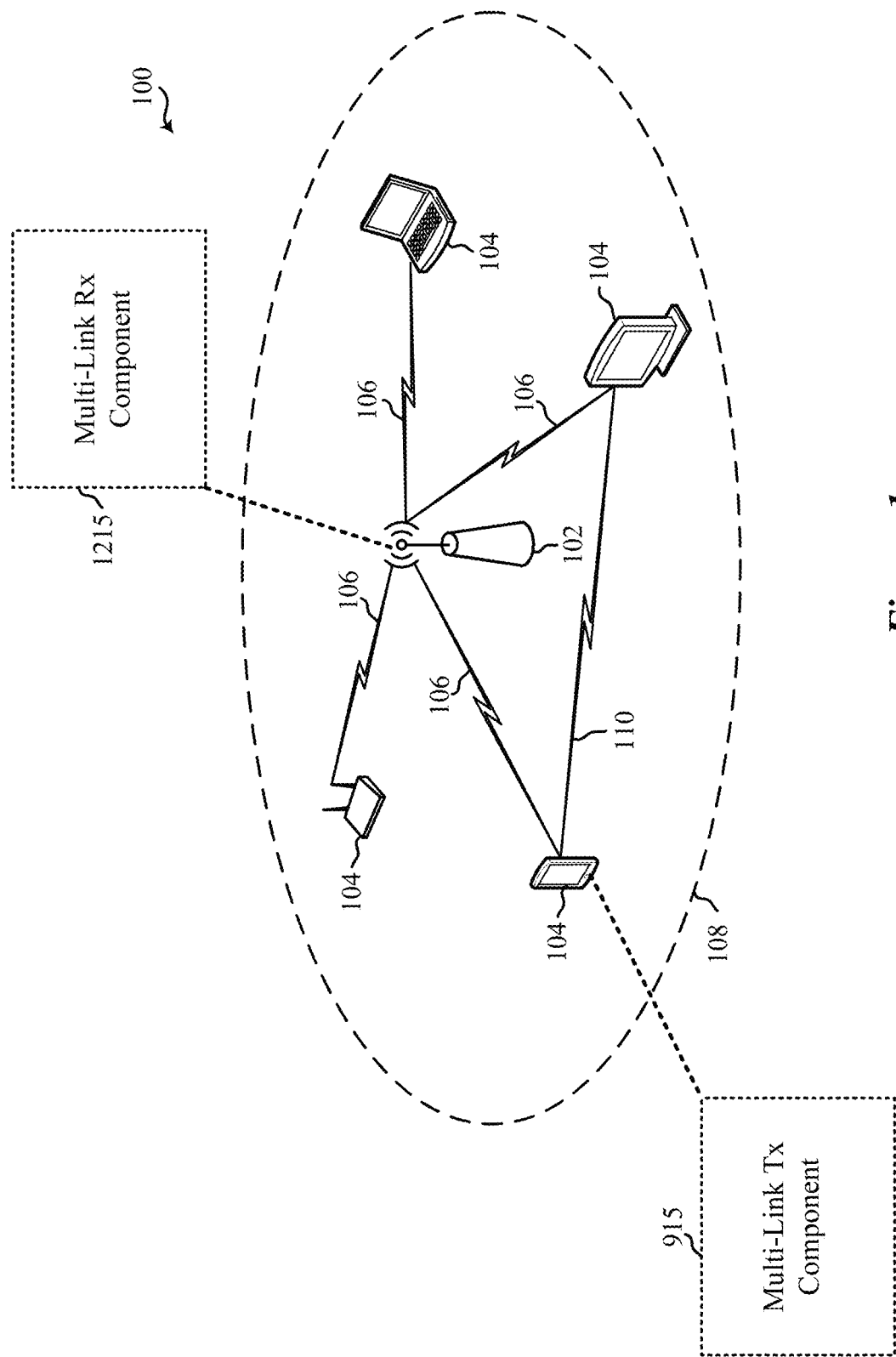
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Multi-link operation (MLO) allows sending physical (PHY) protocol data units (PPDUs) on more than one link between a STA and an AP. The links may be carried on different channels, which may be in different bands. Based on the band or channel separation and filter performance, there may be restrictions on the way the PPDUs are sent on each of the links.

In a basic transmission mode, there may be multiple primary links, but a device may transmit on one link at a time. The device (such as an AP or STA) may count down a random back off (RBO) on both links. The device may transmit on the link that wins the medium. The other link may be blocked by in-device interference. For example, the leakage into the second band may be greater than approximately −62 dBm. As such, the basic transmission mode may not achieve aggregation gains.

In an asynchronous transmission mode, a device may count down the RBO on both links. PPDU transmission may be performed independently on each link. The asynchronous transmission mode may be possible when the device can support simultaneous transmission and reception, for example, when the bands have sufficient separation such as the 2.4 GHz band and the 5 GHz band. The asynchronous transmission mode may provide both latency and aggregation gains. The asynchronous transmission mode, however, may utilize a costly filter (in terms of size or materials) that may not be feasible for client devices such as STAs.

In a synchronous PPDU transmission mode the device may count down the RBO on both links. If a first link wins the medium, both links may transmit PPDUs at the same time. The transmission at the same time may minimize in-device interference. The synchronous PPDU transmission mode may work with low-filter performance. The synchronous PPDU transmission mode may provide both latency and aggregation gains.

Various implementations disclosed herein relate generally to transmitting synchronous PPDUs on channels of different links on different bands by reserving a transmission opportunity (TXOP) for a first link while waiting for a random back off (RBO) of a second link to count down to zero. Some implementations more specifically relate to determining whether to wait for the second RBO before transmitting on the first link. By waiting for the second RBO, the wireless device may be able to increase the bandwidth of the transmission by transmitting two PPDUs with the start and end times aligned to minimize inter-device interference. In some implementations, the wireless device may determine whether to wait for the second RBO based on a trade-off between the added bandwidth of the second link and the idle time of the first link while waiting for the second RBO. For example, in some implementations, the wireless device may determine not to wait when the second RBO exceeds a threshold, or the second link is blocked or becomes blocked while waiting. In some implementations, the wireless device may select or adjust a value of the second RBO to improve the likelihood of the second RBO counting down to zero. For example, the wireless device may set the second RBO to zero to allow a transmission on the second link. In some implementations, the wireless device may store a residual value of the second RBO when adjusting the second RBO. The wireless device may increase the second RBO for a subsequent transmission based on the residual value.

Particular implementations of the subject matter described in this disclosure can be implemented to realize one or more of the following potential advantages. In some implementations, the described techniques may be used to realize one or both of gains in bandwidth and reductions in latency as compared to single link transmissions. For example, by selectively using synchronous transmissions on the first link and the second link, the subject matter described herein may increase transmission bandwidth when the channels of both links are available. Further, because a wireless device may transmit on whichever link becomes available first without waiting for the second link, the subject matter described herein may reduce latency. Additionally, where the wireless device adjusts the second RBO, increasing the second RBO for a subsequent transmission may improve fairness to other devices that share the channel of the second link.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102. In an aspect, one or more wireless communication devices such as the STAs 104 may include a multi-link Tx component 915 as described herein. In an aspect, one or more wireless communication devices such as the AP 102 may include a multi-link Rx component 1215 as described herein.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B9 within range of the STA or to select among multiple APs 102 that together form an extended service set (ESS) including multiple connected B9. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11 ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
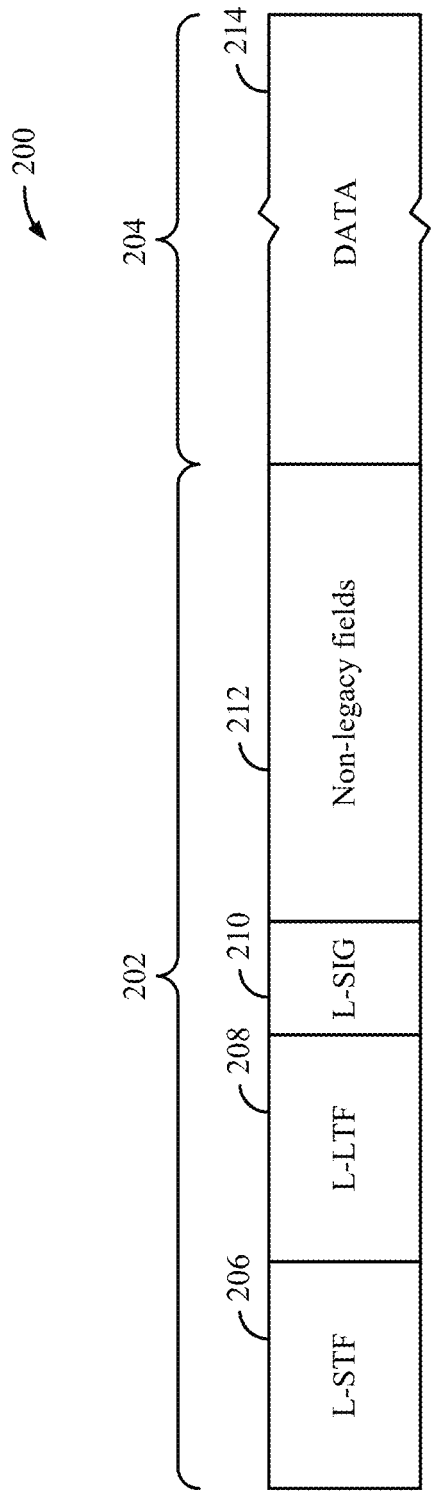
FIG. 2A shows an example physical (PHY) protocol data unit (PPDU) usable for communications between an access point (AP) and a number of stations (STAs).

FIG. 2A shows an example protocol data unit (PDU) 200 usable for wireless communication between an AP and a number of STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
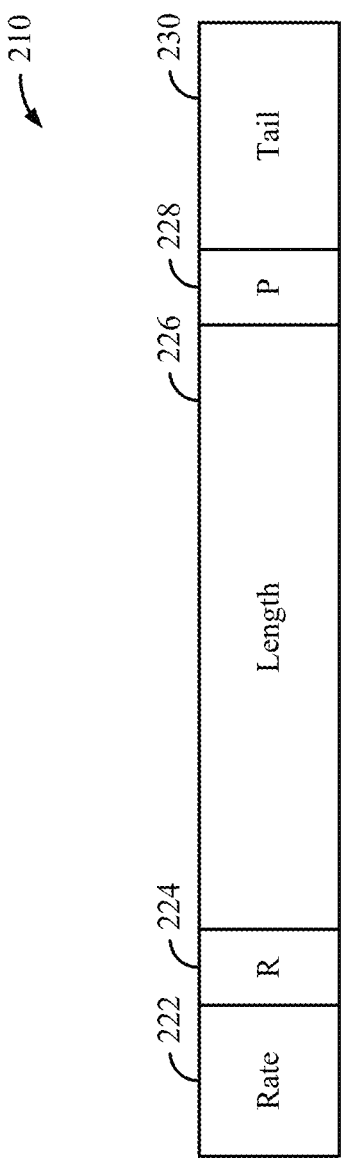
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
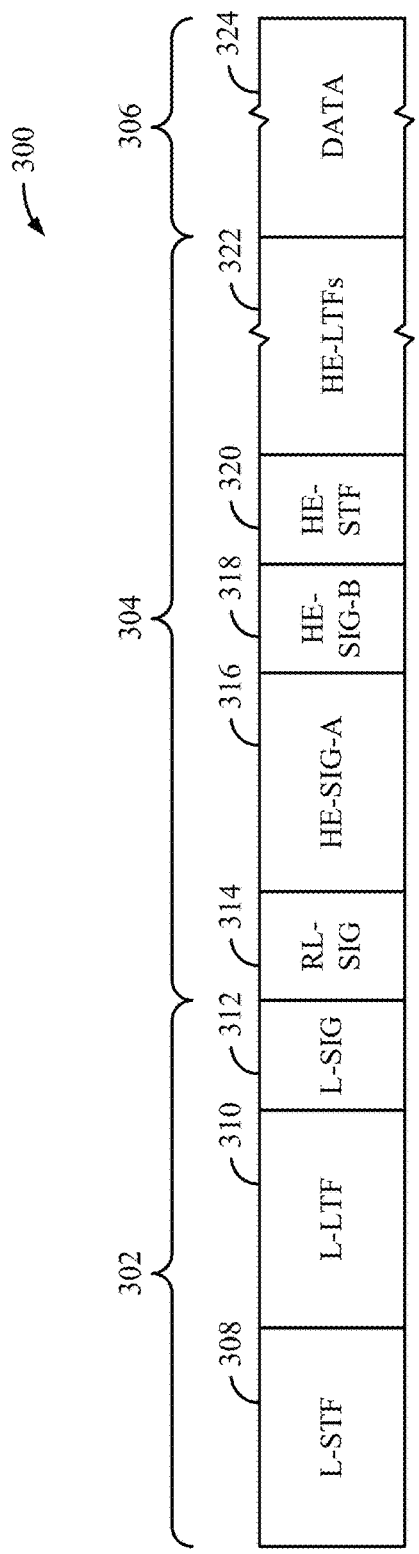
FIG. 3A shows another example PPDU usable for communications between an AP and a number of STAs.

FIG. 3A shows another example PDU 300 usable for wireless communication between an AP and a number of STAs. The PDU 300 may be used for MU-OFDMA or MU-MIMO transmissions. The PDU 300 includes a PHY preamble including a legacy portion 302 and a non-legacy portion 304. The PDU 300 may further include a PHY payload 306 after the preamble, for example, in the form of a PSDU including a DATA field 324. The legacy portion 302 of the preamble includes L-STF 308, L-LTF 310, and L-SIG 312. The non-legacy portion 304 of the preamble and the DATA field 374 may be formatted as a High Efficiency (HE) WLAN preamble and frame, respectively, in accordance with the IEEE 802.11ax amendment to the IEEE 802.11 wireless communication protocol standard. The non-legacy portion 304 includes a repeated legacy signal field (RL-SIG) 314, a first HE signal field (HE-SIG-A) 316, a second HE signal field (HE-SIG-B) 318 encoded separately from HE-SIG-A 316, an HE short training field (HE-STF) 320 and a number of HE long training fields (HE-LTFs) 322. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, HE-SIG-B 318 may be unique to each 20 MHz channel and may target specific STAs 104.

RL-SIG 314 may indicate to HE-compatible STAs 104 that the PPDU is an HE PPDU. An AP 102 may use HE-SIG-A 316 to identify and inform multiple STAs 104 that the AP has scheduled UL or DL resources for them. HE-SIG-A 316 may be decoded by each HE-compatible STA 104 served by the AP 102. HE-SIG-A 316 includes information usable by each identified STA 104 to decode an associated HE-SIG-B 318. For example, HE-SIG-A 316 may indicate the frame format, including locations and lengths of HE-SIG-Bs 318, available channel bandwidths, modulation and coding schemes (MCSs), among other possibilities. HE-SIG-A 316 also may include HE WLAN signaling information usable by STAs 104 other than the number of identified STAs 104.

HE-SIG-B 318 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 318 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 324.

Figure 3B:
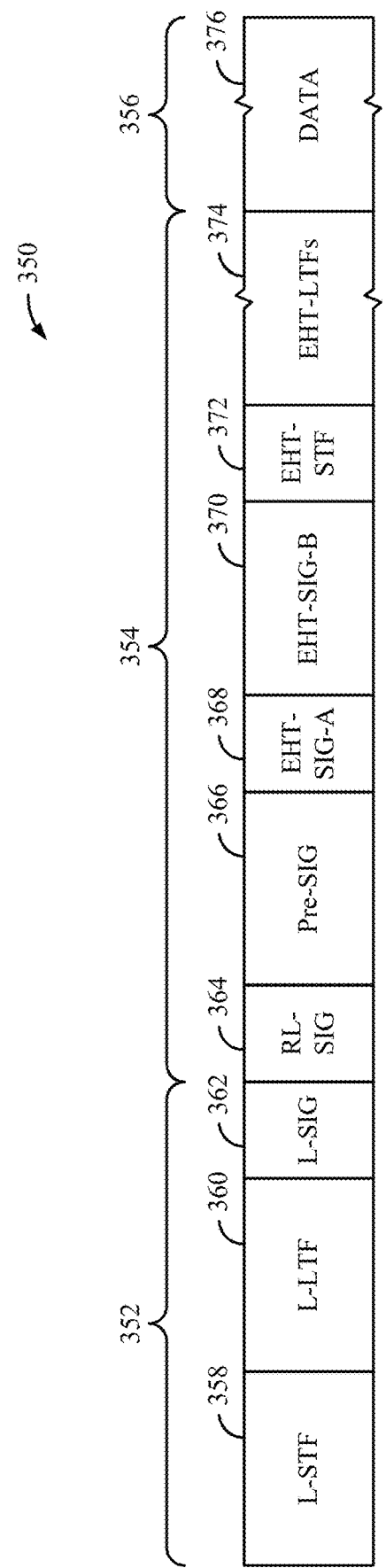
FIG. 3B shows another example PDU usable for communications between an AP and a number of STAs.

FIG. 3B shows an example PPDU 350 usable for wireless communication between an AP and a number of STAs. The PPDU 350 may be used for SU, MU-OFDMA or MU-MIMO transmissions. The PPDU 350 includes a PHY preamble including a legacy portion 352 and a non-legacy portion 354. The PPDU 350 may further include a PHY payload 356 after the preamble, for example, in the form of a PSDU including a DATA field 376. The legacy portion 352 includes L-STF 358, L-LTF 360, and L-SIG 362. The non-legacy portion 354 of the preamble and the DATA field 376 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The non-legacy portion 354 of the preamble includes a second signal field (referred to herein as "Pre-SIG") 366, a third signal field (referred to herein as "EHT-SIG-A" although it may be structured as, and carry version-dependent information for, other wireless communication protocol versions beyond EHT) 368, and a fourth signal field (referred to herein as "EHT-SIG-B" although it may be structured as, and carry version-dependent information for, other wireless communication protocol versions beyond EHT) 370. The non-legacy portion 354 further includes an additional short training field (referred to herein as "EHT-STF" although it may be structured as, and carry version-dependent information for, other wireless communication protocol versions beyond EHT) 372 and a number of additional long training fields (referred to herein as "EHT-LTFs" although they may be structured as, and carry version-dependent information for, other wireless communication protocol versions beyond EHT) 374. Like L-STF 358, L-LTF 360, and L-SIG 362, the information in Pre-SIG 366 and EHT-SIG-A 368 may be duplicated and transmitted in each of the component 20 MHz channels in instances involving the use of a bonded channel. In some implementations, EHT-SIG-A 368 may additionally or alternatively carry information in one or more non-primary 20 MHz channels that is different than the information carried in the primary 20 MHz channel. EHT-SIG-B 370 may be unique to each 20 MHz channel and, as described above, may target specific STAs 104. The non-legacy portion 354 of the preamble may or may not include a repeated legacy signal field (RL-SIG) 364 after L-SIG 362 and before Pre-SIG 366.

EHT-SIG-A 368 may include one or more jointly encoded symbols and may be encoded in a different block from the block in which Pre-SIG 366 is encoded. EHT-SIG-A 368 may be used by an AP to identify and inform multiple STAs 104 that the AP has scheduled UL or DL resources. EHT-SIG-A 368 may be decoded by each compatible STA 104 served by the AP 102. EHT-SIG-A 368 includes information usable by the identified STAs 104 to decode an associated EHT-SIG-B 370. EHT-SIG-A 368 may generally be used by a receiving device to interpret bits in EHT-SIG-B 370 or DATA field 376. For example, EHT-SIG-A 368 may indicate the locations and lengths of EHT-SIG-Bs 370 in the various component channels, available channel bandwidths, and modulation and coding schemes (MCSs), among other possibilities. EHT-SIG-A 368 may further include a cyclic redundancy check (CRC) (for example, four bits) and a tail (for example, 6 bits) that may be used for binary convolutional code (BCC).

EHT-SIG-B 370 may include multiple symbols that may be encoded in a different block from the block in which EHT-SIG-A 368 is encoded. In some other implementations, EHT-SIG-A 368 may be jointly encoded with some or all of EHT-SIG-B 370. For example, EHT-SIG-A 368 may be jointly encoded with a first portion of EHT-SIG-B 370 that includes information common to all users served by the PPDU 350. EHT-SIG-B 370 may carry STA-specific scheduling information such as, for example, per-user MCS values and per-user RU allocation information. EHT-SIG-B 370 may generally be used by a receiving device to interpret bits in the DATA field 376. In the context of DL MU-OFDMA, such information enables the respective STAs 104 to identify and decode corresponding RUs in the associated DATA field 376. Each EHT-SIG-B 370 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

Pre-SIG 366, and RL-SIG 364 if present, may indicate to EHT- or later version-compliant STAs 104 that the PPDU 350 is an EHT PPDU or a PPDU conforming to another non-legacy wireless communication protocol version. For example, Pre-SIG 366 may be used by a receiving device to interpret bits in one or more of EHT-SIG-A 368, EHT-SIG-B 370 or the DATA field 376. In some implementations, Pre-SIG 366 may include a reserved bit that indicates whether the PPDU 350 is, for example, compliant with EHT or a later version (for example, after IEEE 802.11ax) of the IEEE 802.11 family of wireless communication protocol standards or other standards. In some implementations, Pre-SIG 366 includes a version field that includes at least one bit indicating the particular wireless communication protocol version to which the PPDU 350 conforms.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer (or random back off (RBO) timer), which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC BE). This enables particular types of traffic to be prioritized in the network.

Figure 4:
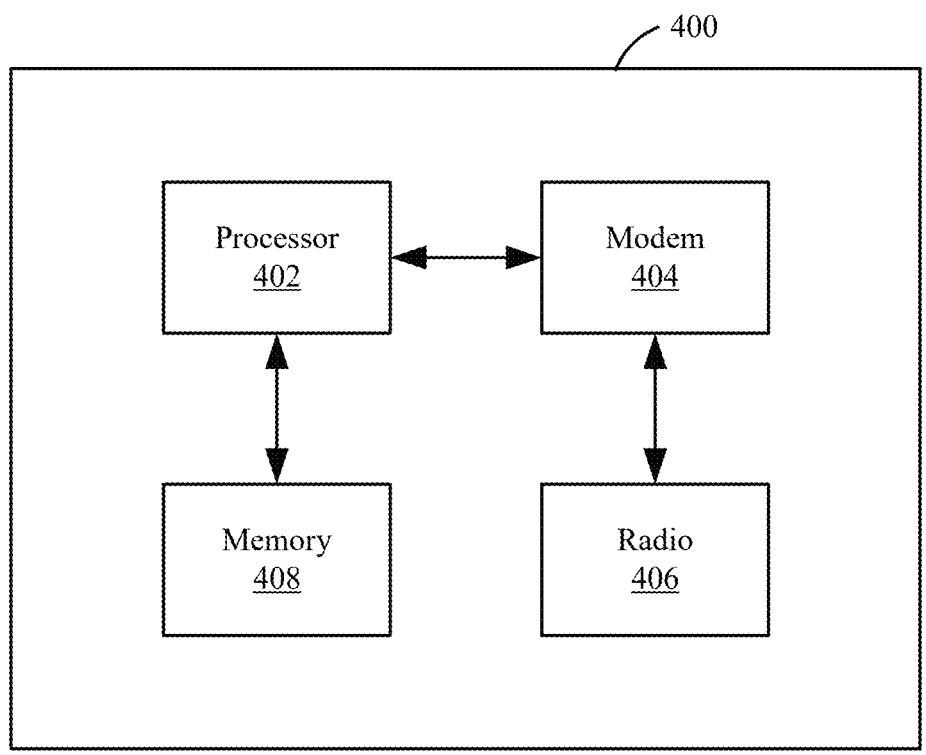
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 404, for example, a Wi-Fi (IEEE 802.11 compliant) modem. In some implementations, the one or more modems 404 (collectively "the modem 404") additionally include a WWAN modem (for example, a 3GPP 4G LTE or 5G compliant modem). In some implementations, the wireless communication device 400 also includes one or more processors, processing blocks or processing elements 402 (collectively "the processor 402") coupled with the modem 404. In some implementations, the wireless communication device 400 additionally includes one or more radios 406 (collectively "the radio 406") coupled with the modem 404. In some implementations, the wireless communication device 400 further includes one or more memory blocks or elements 408 (collectively "the memory 408") coupled with the processor 402 or the modem 404.

The modem 404 can include an intelligent hardware block or device such as, for example, an application-specific integrated circuit (ASIC) among other possibilities. The modem 404 is generally configured to implement a PHY layer, and in some implementations, also a portion of a MAC layer (for example, a hardware portion of the MAC layer). For example, the modem 404 is configured to modulate packets and to output the modulated packets to the radio 406 for transmission over the wireless medium. The modem 404 is similarly configured to obtain modulated packets received by the radio 406 and to demodulate the packets to provide demodulated packets. In addition to a modulator and a demodulator, the modem 404 may further include digital signal processing (DSP) circuitry, automatic gain control (AGC) circuitry, a coder, a decoder, a multiplexer and a demultiplexer. For example, while in a transmission mode, data obtained from the processor 402 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 402) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 404 are provided to the radio 406, which then transmits the symbols via the coupled antennas. Similarly, symbols received via the antennas are obtained by the radio 406, which then provides the symbols to the modem 404.

The processor 402 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 402 processes information received through the radio 406 and the modem 404, and processes information to be output through the modem 404 and the radio 406 for transmission through the wireless medium. For example, the processor 402 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 402 may generally control the modem 404 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 402, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
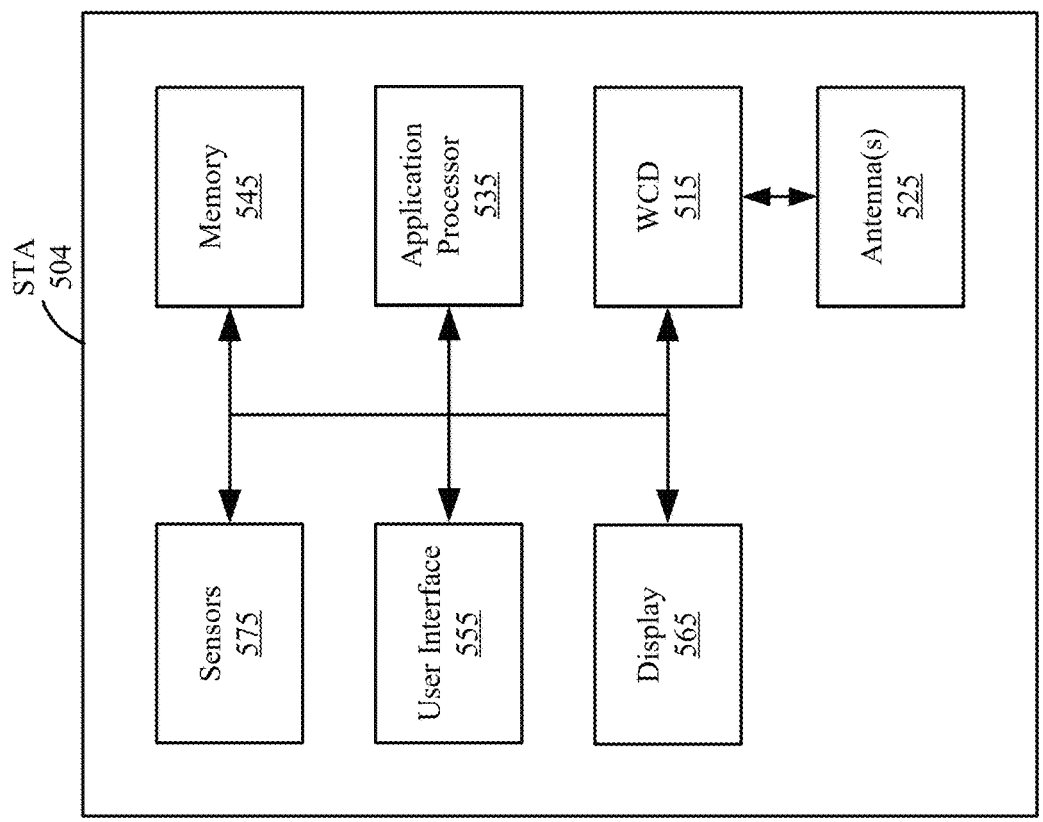
FIG. 5B shows a block diagram of an example station (STA).
Figure 5A:
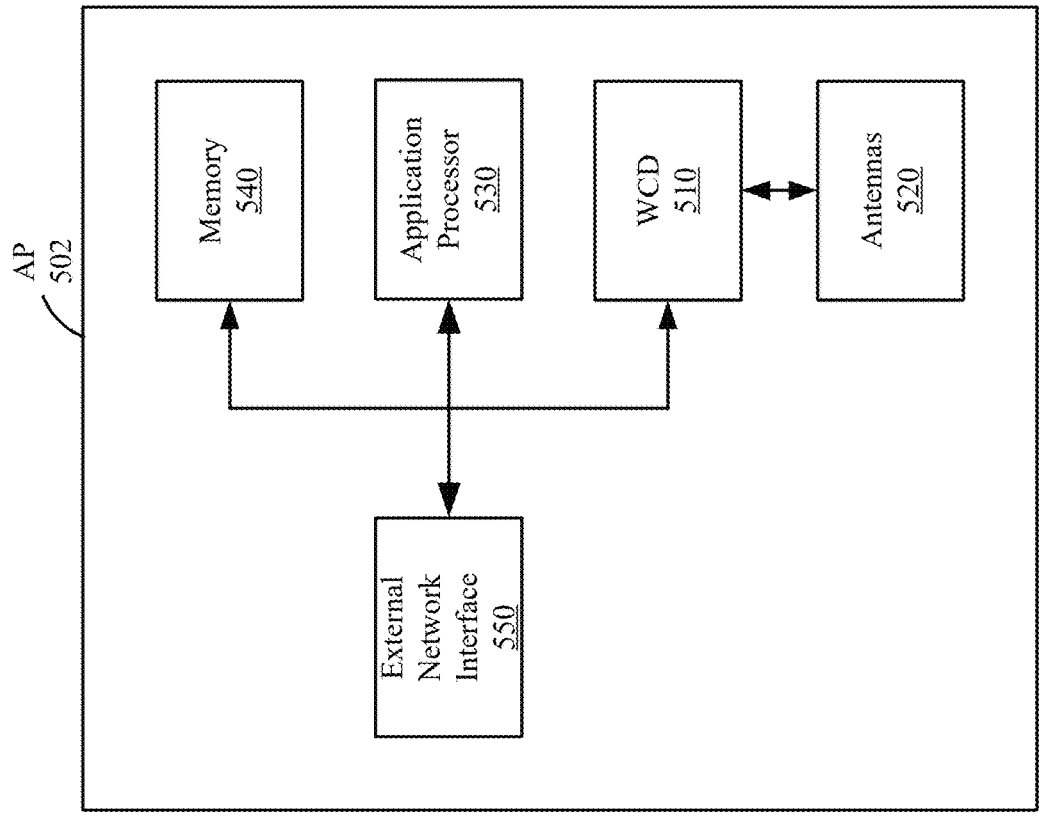
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, in a synchronous PPDU transmission mode for multi-link operation, a wireless device may count down the RBO on both links. In some cases, the wireless device may be restricted from accessing a channel of a second link at the same time that the wireless device is able to access a channel of the first link. A multi-link device (MLD) that is capable of simultaneous transmission and reception on multiple links for a given set of links may be referred to as a simultaneous transmission and reception (STR) device. For example, a MLD with a standard filter may simultaneously transmit on a 2.4 GHz band and receive on a 5 GHz band and be considered a STR device for those links. A MLD that is not capable of simultaneous transmission and reception on multiple links for a given set of links may be referred to as a non-STR (NSTR) device. For example, a MLD device with a standard filter may not be able to simultaneously transmit on a 5 GHz band and receive on a 6 GHz band and may be considered a NSTR device for that those links. In contrast, if the MLD device has a very good filter, which may be true for an AP, the MLD device may be able to simultaneously transmit on a 5 GHz band and receive on a 6 GHz band and may be considered a STR device for that those links.

Figure 6A:
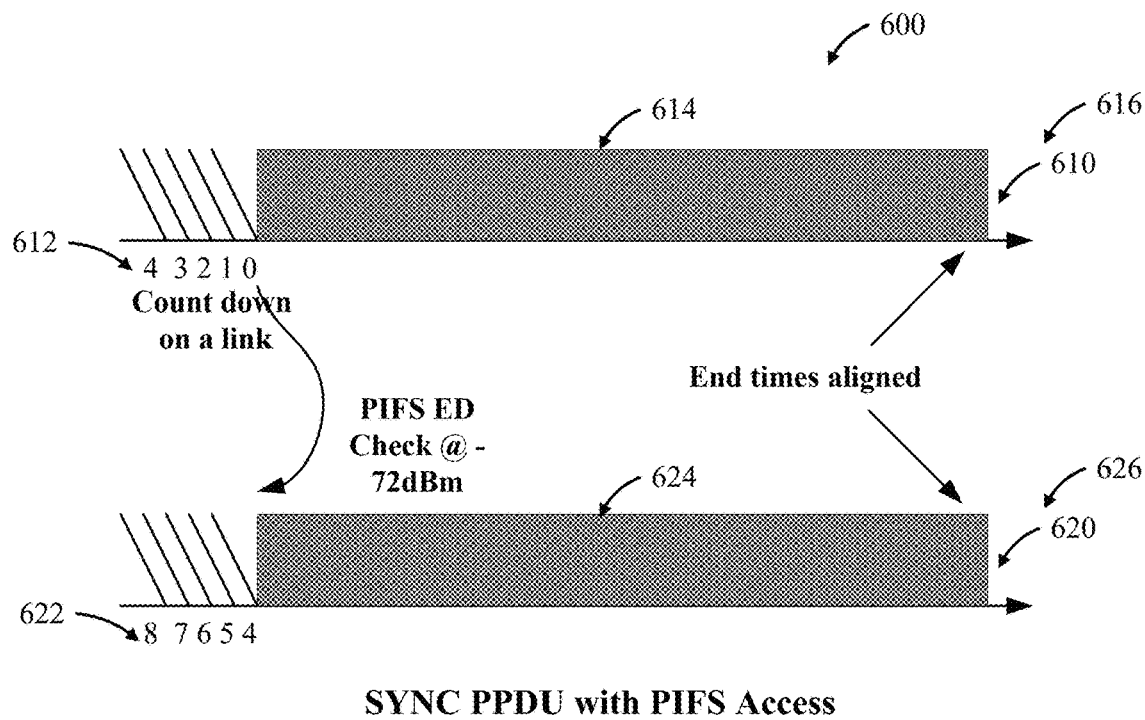
FIG. 6A shows an example scenario for multi-link operation using synchronous PPDUs with point coordination function (PCF) inter-frame spacing (PIFS) access.

FIG. 6A shows an example scenario 600 for multi-link operation (MLO) using synchronous PPDUs with point coordination function (PCF) inter-frame spacing (PIFS) access. PIFS access allows a wireless device to access a second channel 620 of a second link 626 based on a previous idle period when the wireless device obtains access to a first channel 610 of a first link 616. For example, in the scenario 600, the wireless device may count down a first RBO 612 for the first channel 610 and a second RBO 622 for the second channel 620. When the first RBO 612 counts down to zero, the wireless device may check that the second channel 620 has been clear (for example, energy detected is less than approximately −72 dBm) for a PIFS period. If so, the wireless device may transmit on the second channel 620 as well as the first channel 610.

In some aspects, for example, where the first channel 610 and the second channel 620 are in different bands, the wireless device may not be allowed to use PIFS access to transmit on the second channel 620. For example, a regulation or standards document may indicate that PIFS access may not be used for inter-band multi-link operation.

Figure 6B:
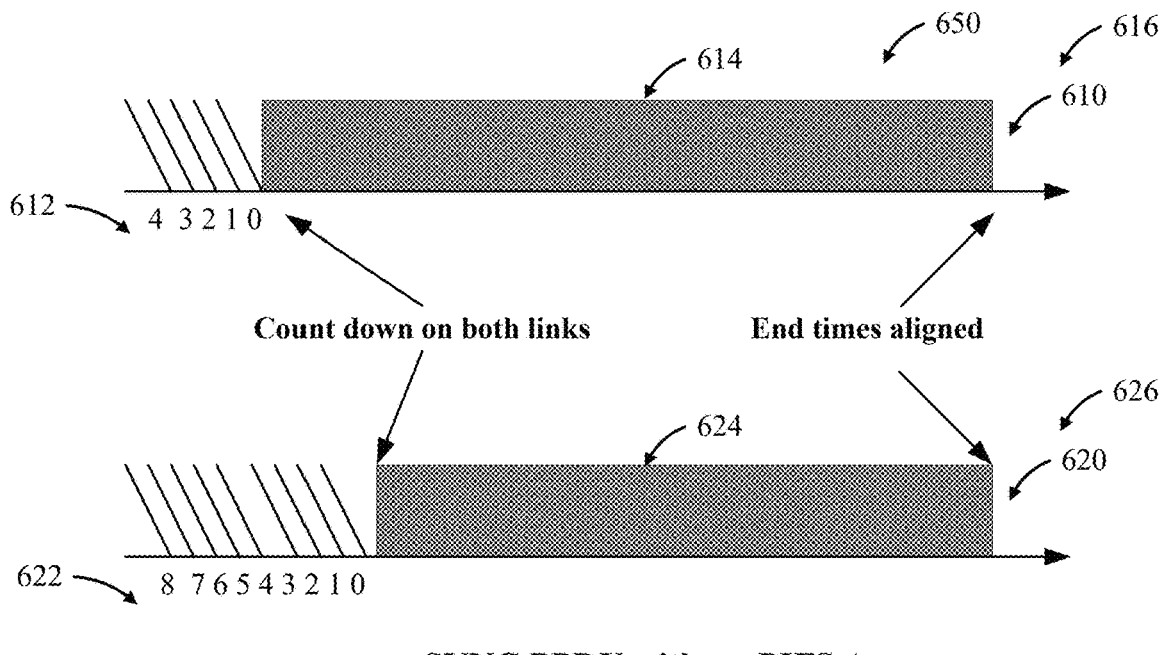
FIG. 6B shows an example scenario for multi-link operation (MLO) using synchronous PPDUs without PIFS access.

FIG. 6B shows an example scenario 650 for multi-link operation using synchronous PPDUs without PIFS access. Similar to the scenario 600, the wireless device may count down a first RBO 612 for the first channel 610 and a second RBO 622 for the second channel 620. When the first RBO 612 counts down to zero, the second RBO 622 may have a count down remaining. For example, the RBO 622 may have a value of four (4) at the time the first RBO 612 counts down to zero. The second RBO 622 may continue to count down until reaching zero. If the wireless device is a NSTR device for the first channel 610 and the second channel 620, the wireless device may be unable to monitor the second channel 620 while transmitting on the first channel 610. For example, the wireless device may delay transmission on the first channel 610 until the second RBO 622 counts down to zero. However, if the wireless device does not access the first channel 610 immediately after it wins the first channel 610, some other device may take the first channel 610. The wireless device may reset the first RBO in response to the other device using the first channel. The wireless device may wait for the first RBO 612 and the second RBO 622 to count down to zero. Accordingly, waiting for the second RBO 622 may result in poor performance such as increased latency in the scenario 650.

Figure 7:
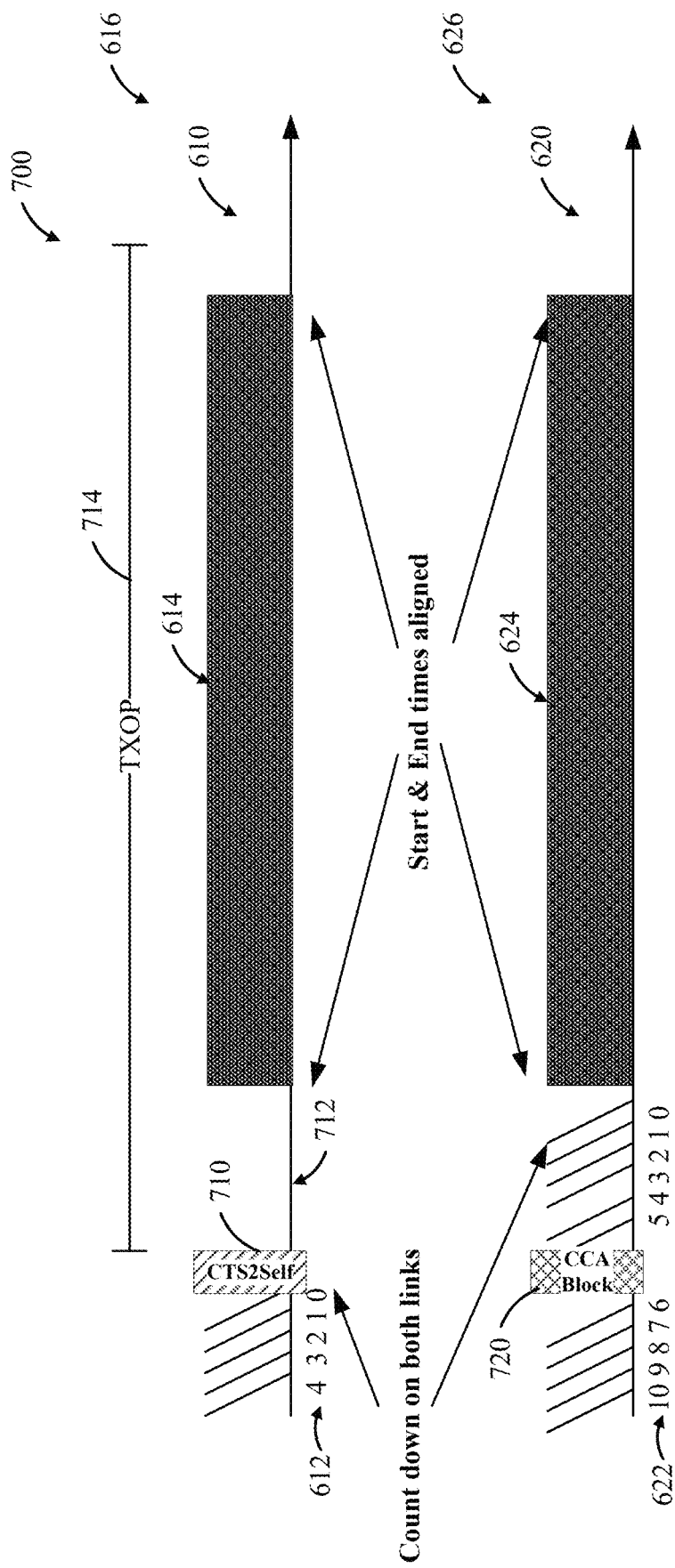
FIG. 7 shows an example scenario for multi-link operation including a medium reservation message to wait for a second link to become available.

FIG. 7 shows an example scenario 700 for multi-link operation including a medium reservation message 710 to wait for a second link to become available. Similar to the scenario 600, the wireless device may count down a first RBO 612 for the first channel 610 of the first link 616 and a second RBO 622 for the second channel 620 of a second link 626. The first link 616 and the second link 626 may be in different bands, but a transmission on one of the links may cause inter-device interference to the other link. Accordingly, the wireless device may not be able to simultaneously transmit one of the first link 616 or the second link 626 and receive on the other of the first link 616 or the second link 626. The wireless device may, however, be able to simultaneously transmit on both of the first link 616 and the second link 626 or simultaneously receive on the first link 616 and the second link 626. In some implementations, the first link 616 may be in one of a 5 GHz band or a 6 GHz band and the second link 626 may be in the other of the 5 GHz band or the 6 GHz band.

When the first RBO 612 counts down to zero, the second RBO 622 may have a count down remaining. The wireless device may transmit a medium reservation message 710 reserving a TXOP 714 on the first channel 610 of the first link 616. In some implementations, the medium reservation message 710 may be a clear to send to self (CTS2Self) message that reserves the TXOP 714. In some implementations, the medium reservation message 710 may be a modified request to send (RTS) message requesting the TXOP 714. For example, the modified RTS message may utilize a special scrambling code to indicate that a PPDU on the first channel 610 may not start immediately. The AP may respond with a CTS message indicating the TXOP 714. The TXOP 714 may be used to transmit a PPDU at any time during the TXOP 714. The wireless device may either wait for the second RBO 622 to count down to zero or transmit the PPDU on the first channel 610 without waiting.

Generally, determining whether to wait for the second RBO 622 before transmitting on the first link 616 may be based on a probability of accessing the second link 626 and an idle period on the first link 616 between the medium reservation message and an expected availability of the second link 626. For example, determining whether to wait for the second RBO may be based on a trade-off between the added bandwidth of the second link 626 and the idle time 712 of the first link 616 while waiting for the second RBO 622. In some implementations, determining whether to wait for the second RBO before transmitting on the first link 616 may include determining to transmit the first PPDU without waiting in response to determining that the remaining count for the second RBO 622 is greater than a threshold. The threshold may be configured by the wireless device. In some implementations, determining whether to wait for the second RBO before transmitting on the first link 616 may include determining to transmit the first PPDU without waiting in response to determining that the second channel 620 is blocked by a network allocation vector (NAV). In some implementations, the wireless device may initially determine to wait for the second RBO 622 before transmitting on the first link 616. The wireless device may later determine to transmit on the first link 616 without waiting in response to determining that the second link 626 has become blocked (for example, by a NAV). Determining that the second link 626 has become blocked may include determining that a waiting time has expired. For example, the waiting time may be configured by the wireless device or indicated by the AP.

In some aspects, the medium reservation message 710 may cause inter-device interference to the second channel 620. Accordingly, during a period 720, the CCA procedure for the second channel 620 may be blocked and the second RBO 622 may not be counted down. The wireless device may resume counting down the second RBO 622 after the period 720. For instance, the wireless device may skip DIFS or AIFS because the interference to the second link 626 is created due to the transmission of the medium reservation message 710 on the first link 616.

Figure 8:
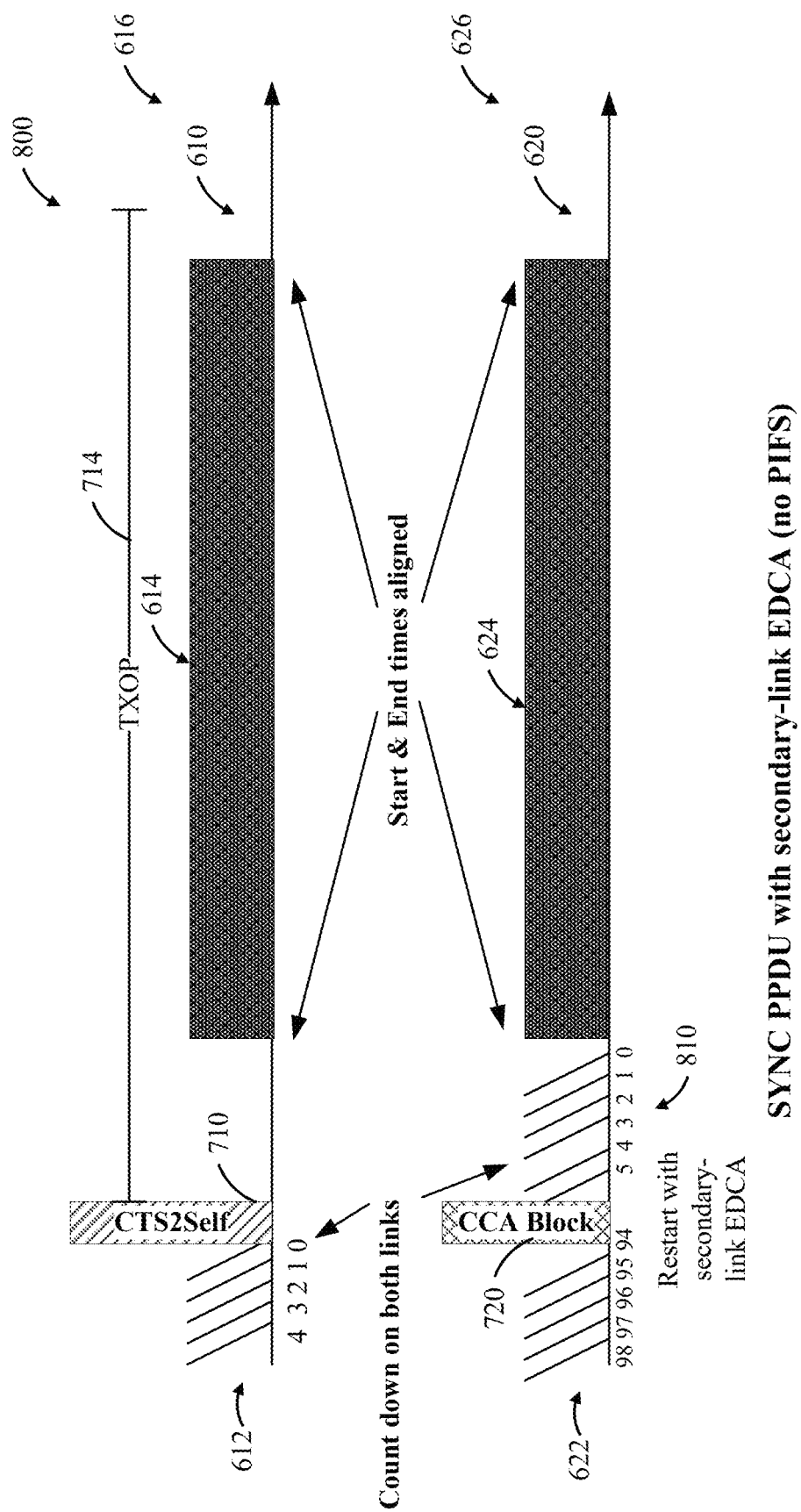
FIG. 8 shows an example scenario for multi-link operation including a medium reservation message and secondary link parameters.

FIG. 8 shows an example scenario for multi-link operation including a medium reservation message and secondary link parameters. Similar to the scenario 700, the wireless device may count down a first RBO 612 for the first channel 610 and a second RBO 622 for the second channel 620. When the first RBO 612 counts down to zero, the second RBO 622 may have a count down remaining. The wireless device may transmit a medium reservation message 710 reserving a TXOP 714 on the first channel 610 of the first link 616. In the scenario 800, the second RBO 622 may have a much greater value than the first RBO 612. In some implementations, the second link 626 may be configured with a secondary enhanced distributed channel access (EDCA) set. The secondary EDCA set may include first phase EDCA parameters to be used when the station has not grasped another channel and second-phase EDCA parameters to be used when the station has grasped another channel. A random back off (RBO) range (contention window) for the second-phase EDCA parameters may include values less than a RBO range for the first-phase EDCA parameters. The wireless device may adjust the remaining count 810 for the second RBO 622 based on the second-phase EDCA parameters in response to transmitting the medium reservation message 710. For example, the wireless device may adjust the remaining count 810 when the remaining count 810 is less than a threshold (h). Accordingly, the second RBO 622 may be more likely to count down to zero during the TXOP 714 based on the second-phase EDCA parameters. In some aspects, when the wireless devices adjusts the remaining count 810 for the second RBO 622, the remaining count 810 may be stored as a residual value (c). The residual value may be considered a "credit" that the wireless device has borrowed. The wireless device may add the residual value, possibly with a weighting factor (alpha) to a subsequent RBO for the second link. Accordingly, for fairness to other devices, the wireless device may count down an additional alpha*c before a subsequent transmission on the second link. The parameters h and alpha may be dynamically configured for fairness. For example, the threshold, h, may be set to a relatively high value when channel traffic is relatively low, and set to a relatively low value when channel traffic is relatively high. The weighting factor, alpha, may be set to 1 in the low traffic scenario and set to a higher value in higher traffic scenarios.

Figure 9:
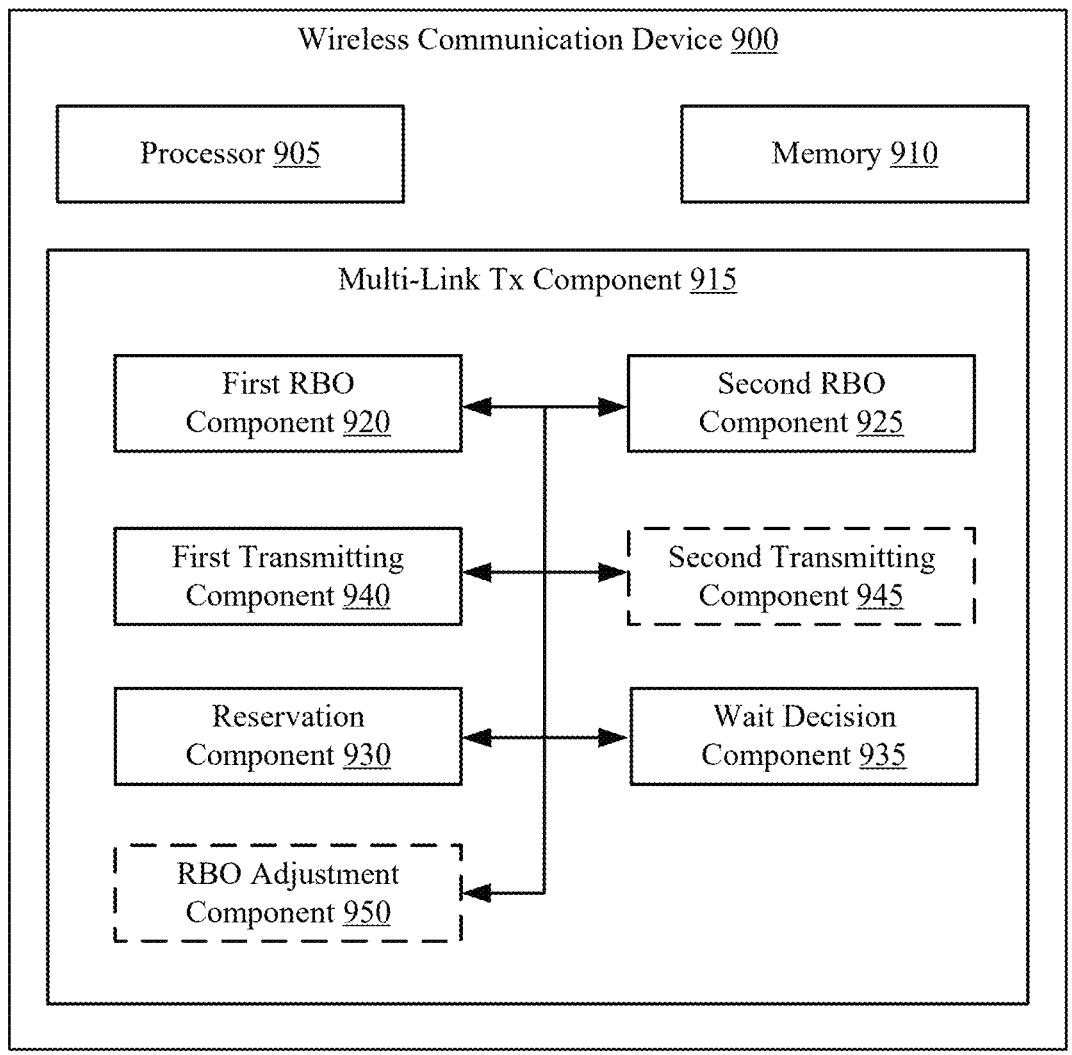
FIG. 9 shows a block diagram of an example wireless communication device.

FIG. 9 shows a block diagram of an example wireless communication device 900. In some implementations, the wireless communication device 900 is configured to perform the process 1000 described with reference to FIGS. 10 and 11. The wireless communication device 900 may be an example implementation of the wireless communication device 400 described with reference to FIG. 4. For example, the wireless communication device 900 can be a chip, SoC, chipset, package or device that includes at least one processor and at least one modem (for example, a Wi-Fi (IEEE 802.11) modem, or a cellular modem). In some implementations, the wireless communication device 900 can be a device for use in a STA, such as one of the STAs 104 and 504 described with reference to FIGS. 1 and 5B, respectively. In some other implementations, the wireless communication device 900 can be a STA that includes such a chip, SoC, chipset, package or device as well as at least one transmitter, at least one receiver, and at least one antenna.

The wireless communication device 900 includes a processor 905 and a memory 910. The wireless communication device 900 may include a multi-link Tx component 915, which may include a first RBO component 920, a second RBO component 925, a reservation component 930, a first transmitting component 940, a second transmitting component 945, and an RBO adjustment component 950. Portions of one or more of the components 915, 920, 925, 930, 940, 945, and 950 may be implemented at least in part in hardware or firmware. For example, the multi-link Tx component 915 may be implemented at least in part by a modem (such as the modem 404). In some implementations, at least some of the components 915, 920, 925, 930, 940, 945, and 950 are implemented at least in part as software stored in a memory (such as the memory 408 or the memory 910). For example, portions of one or more of the components 915, 920, 925, 930, 940, 945, and 950 can be implemented as non-transitory instructions (or "code") executable by a processor (such as the processor 402 or processor 905) to perform the functions or operations of the respective component.

The multi-link Tx component 915 is configured to transmit synchronous PPDUs on channels of different links on different bands by reserving a TXOP for a first link 616 while waiting for a RBO of a second link 626 to count down to zero.

The first RBO component 920 is configured to count down a first RBO for a first channel of a first link 616 and determine that the first RBO has counted down to zero.

The second RBO component 925 is configured to count down a second RBO for a second channel of a second link 626 and determine, when the first RBO has counted down to zero, that the second RBO has a count down remaining. In some implementations, the second RBO component 925 may be configured to determine that the second RBO has counted down to zero in response to determining to wait for the second RBO.

The reservation component 930 is configured to transmit a medium reservation message on the first link 616 reserving a TXOP. In some implementations, the medium reservation message is one of a CTS2Self message or a modified RTS message.

The wait decision component 935 is configured to determine whether to wait for the second RBO before transmitting on the first link 616.

The first transmitting component 940 is configured to transmit at least a first PPDU on the first link 616 during the TXOP.

The second transmitting component 945 is configured to transmit a second PPDU on the second link 626. The second transmitting component 945 may align a start time and an end time of the first PPDU and the second PPDU.

Figure 10:
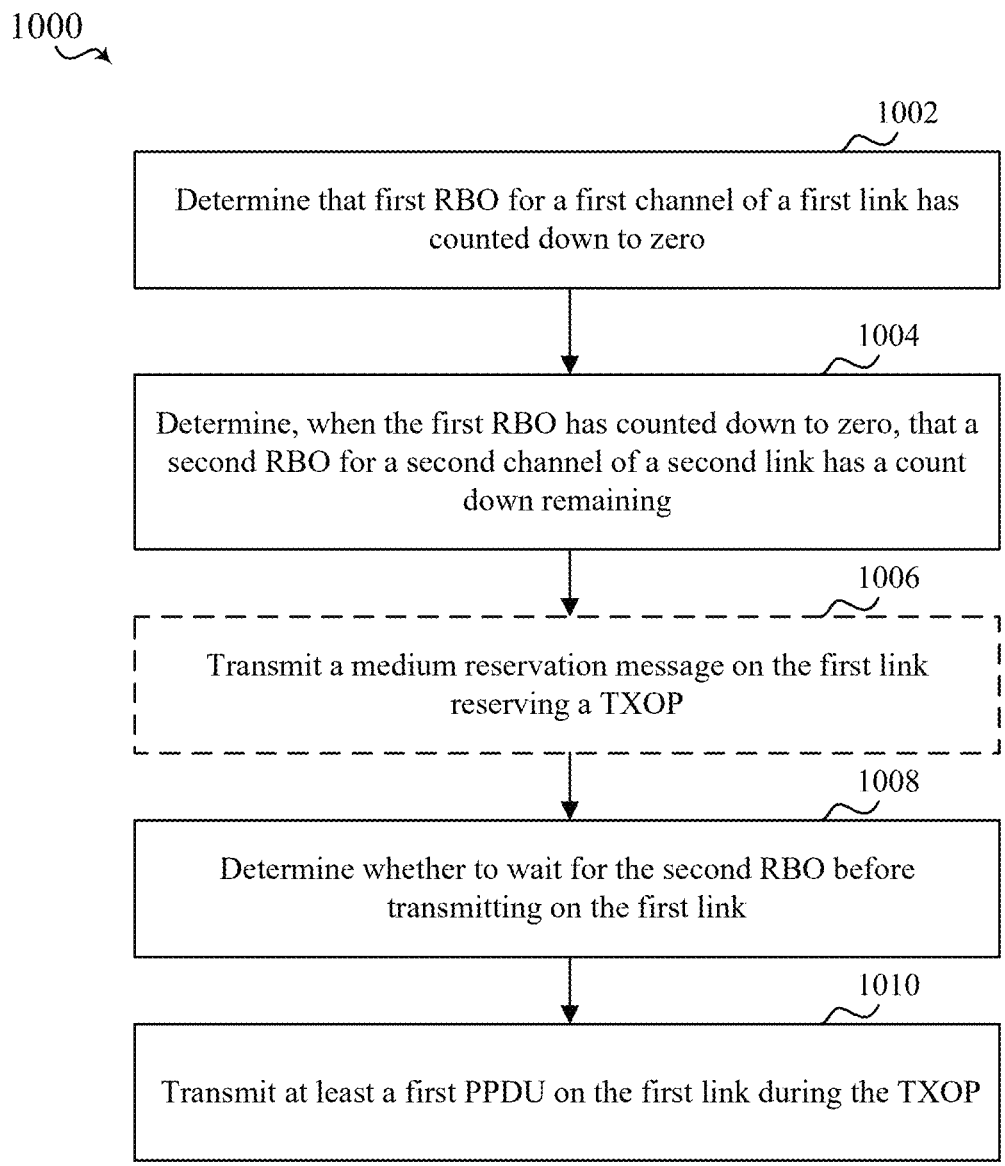
FIG. 10 shows a flowchart illustrating an example process for transmitting on multiple-links.

FIG. 10 shows a flowchart illustrating an example process 1000 for transmitting on multiple-links. The process 1000 may be performed by a wireless communication device such as the wireless communication device 400 described with reference to FIG. 4. In some implementations, the process 1000 may be performed by a wireless communication device operating as or within a STA, such as one of the STAs 104 and 504 described with reference to FIGS. 1 and 5B, respectively. Optional blocks are shown with dashed lines In block 1002, the process 1000 includes determining that a first RBO for a first channel of a first link 616 has counted down to zero. For example, in an aspect, wireless communication device 900, processor 905, memory 910, multi-link Tx component 915, or first RBO component 920 may be configured to or may include means for determining that a first RBO for a first channel of a first link 616 with an access point has counted down to zero. For example, the first RBO component 920 may count down (for example, decrement) the first RBO 612 each time the first channel is unoccupied in a slot. The first RBO component 920 may determine that the first RBO 612 has counted down to zero when a value of the first RBO 612 reaches zero.

In block 1004, the process 1000 includes determining, when the first RBO has counted down to zero, that a second RBO for a second channel of a second link 626 has a count down remaining. For example, in an aspect, wireless communication device 900, processor 905, memory 910, multi-link Tx component 915, or second RBO component 925 may be configured to or may include means for determining, when the first RBO 612 has counted down to zero, that a second RBO 622 for a second channel 620 of a second link 626 has a count down remaining. For example, the second RBO component 925 may determine a value of the second RBO 622 in response to the first RBO component 920 indicating that the first RBO 612 has counted down to zero. If the value of the second RBO 622 is greater than zero, the second RBO component 925 may determine that the second link 626 has a count down remaining.

In block 1006, the process 1000 optionally includes transmitting a medium reservation message on the first link 616 reserving a TXOP. For example, in an aspect, wireless communication device 900, processor 905, memory 910, multi-link Tx component 915, or reservation component 930 may be configured to or may include means for transmitting a medium reservation message 710 on the first link 616 reserving a TXOP 714. In some implementations, the medium reservation message 710 is one of a CTS2Self message or a modified RTS message. The medium reservation message 710 may reserve the first channel 610 of the first link 616 such that other devices do not obtain the first channel 610 while the wireless communication device 900 is waiting or the second RBO 622. A CTS2Self message may be transmitted by the wireless communication device 900 without involvement of an AP. A modified RTS message may inform an AP that the PPDU may be delayed. The AP may transmit a CTS message, which may be received by additional devices (such as hidden nodes), thereby preventing collisions during the TXOP 714.

In block 1008, the process 1000 includes determining whether to wait for the second RBO before transmitting on the first link 616. For example, in an implementation, wireless communication device 900, processor 905, memory 910, multi-link Tx component 915, or wait decision component 935 may be configured to or may include means for determining whether to wait for the second RBO before transmitting on the first link 616. In some implementations, the determining in block 1008 may be based on a probability of accessing the second link 626 and an idle time 712 on the first link 616 between the medium reservation message 710 and an expected availability of the second link 626. The expected availability of the second link 626 may be estimated based on the second RBO 622. In some implementations, the wait decision component 935 may apply rules to determine whether to wait for the second RBO 622. For instance, the wait decision component 935 may determine to transmit the first PPDU without waiting in response to determining that the second RBO is greater than a threshold. The threshold may be based on a configuration of the wait decision component 935. In an implementation, the threshold may be selected based on a machine-learning process that selects a threshold value to optimize a transmission metric such as latency or bandwidth. As another example, the wait decision component 935 may determine to transmit the first PPDU without waiting in response to determining that the second channel is blocked by a NAV. Further details with respect to determining to wait for the second RBO 622 are described with respect to FIG. 11.

In block 1010, the process 1000 includes transmitting at least a first PPDU on the first link 616 during the TXOP. For example, in an aspect, wireless communication device 900, processor 905, memory 910, multi-link Tx component 915, or first transmitting component 940 may be configured to or may include means for transmitting at least a first PPDU 614 on the first link 616 during the TXOP 714.

Figure 11:
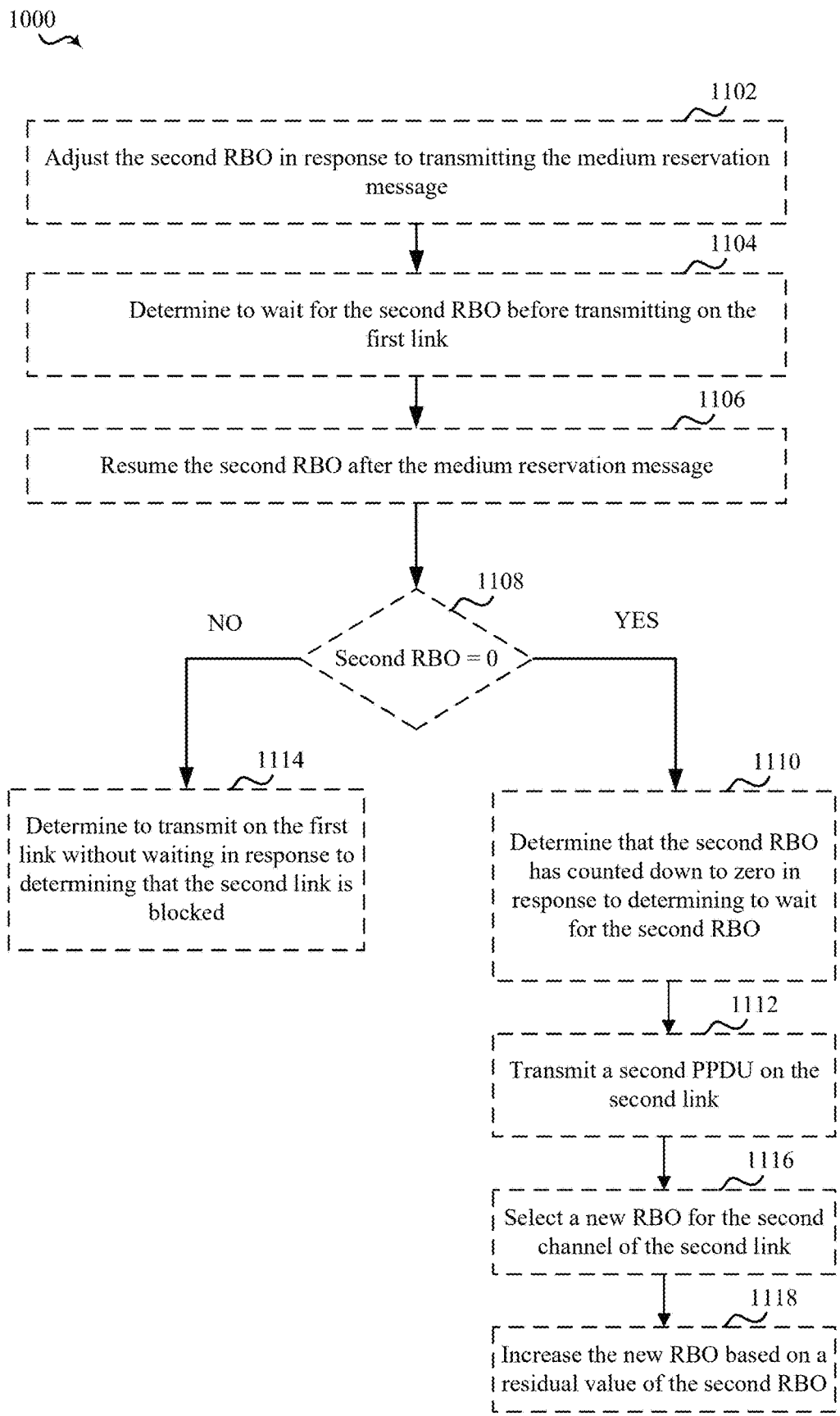
FIG. 11 shows a flowchart illustrating additional optional blocks of the example process of FIG. 10.

FIG. 11 shows a flowchart illustrating additional optional blocks of the example process 1000.

In some implementations, in block 1102, the process 1000 may include adjusting the second RBO in response to transmitting the medium reservation message. For example, in an aspect, wireless communication device 900, processor 905, memory 910, multi-link Tx component 915, or RBO adjustment component 950 may be configured to adjust the second RBO 622 in response to transmitting the medium reservation message 710. For example, in some implementations, an access point (AP) for the second link 626 may advertise an EDCA set including second-phase EDCA parameters. The RBO adjustment component 950 may adjust the second RBO 622 based on the second-phase EDCA parameters in response to transmitting the medium reservation message. As another example, in some implementations, the RBO adjustment component 950 may determine that the count down remaining of the second RBO 622 is less than a threshold (h). The adjustment component 950 may set the count down remaining of the second RBO 622 to zero. In some implementations, the RBO adjustment component 950 may store the count down remaining of the second RBO 622 as the residual value (c).

In some implementations, in block 1104, the process 1000 may include determining to wait for the second RBO before transmitting on the first link 616. For example, the wait decision component 935 may determine that the second RBO is less than a threshold. The wait decision component 935 may reset the first RBO in response to another device using the first channel. For example, the wait decision component 935 may set a value of the first RBO based on the count down remaining of the second RBO. For instance, the wait decision component 935 may set the value of the first RBO to the count down remaining of the second RBO. In an implementation, the value of the first RBO may be within 5% of the count down remaining of the second RBO. The wireless device 900 may wait for the first RBO 612 and the second RBO 622 to count down to zero In some implementations, in block 1106, the process 1000 may include resuming the second RBO 622 after the medium reservation message. For example, the second RBO component 925 may resume the second RBO 622 after the medium reservation message 710. The second RBO component 925 may continue to count down the second RBO 622 for each slot that the second channel is unoccupied.

In some implementations, in block 1108, the process 1000 may include determining whether the second RBO has counted down to 0.

In some implementations, in block 1110, the process 1000 may include determining that the second RBO has counted down to zero in response to determining to wait for the second RBO. For example, the second RBO component 925 may determine that the second RBO 622 has counted down to zero in response to determining to wait for the second RBO 622.

In some implementations, in block 1112, the process 1000 may include transmitting a second PPDU on the second link 626. In an aspect, for example, the second transmitting component 945 may transmit a second PPDU on the second link 626. A start time and an end time of the first PPDU and the second PPDU are aligned.

In some implementations, in block 1114, the process 1000 may include determining to transmit on the first link 616 without waiting in response to determining that the second link 626 is blocked. For instance, determining that the second link 626 is blocked may include determining that a waiting time has expired. The waiting time may be configured for the wireless communication device 900. In some implementations, an AP may configure the waiting time as a maximum time allowed between transmission of a medium reservation message and a PPDU.

In some implementations, in block 1116, the process 1000 may include selecting a new RBO for the second channel of the second link. For instance, the new RBO may be based on the first phase EDCA parameters for the second link.

In some implementations, in block 1118, the process 1000 may include increasing the new RBO based on the residual value of the second RBO. For example, the RBO adjustment component 950 may add the residual value, c, to the new RBO. In some implementations, the residual value c, may be adjusted by the weighting factor, alpha. For example, the RBO adjustment component 950 may add the value of alpha*c to the new RBO. The increase of the new RBO may compensate for the previous reduction of the second RBO for fairness to other devices that share the second link. In some implementations, a first new RBO for the first channel and a second new RBO for the second channel may be increased based on the EDCA parameters such as the threshold, h, the weighting factor, alpha, or a combination thereof. For example, the RBO adjustment component 950 may add an offset to the first new RBO and the second new RBO to establish a credit. For instance, the RBO adjustment component 950 may add the value of alpha*h to the first new RBO and to the second new RBO. When either the first new RBO or the second new RBO counts down to zero, the wireless communication device 400 may transmit a PPDU on both of the first channel and the second channel.

Figure 12:
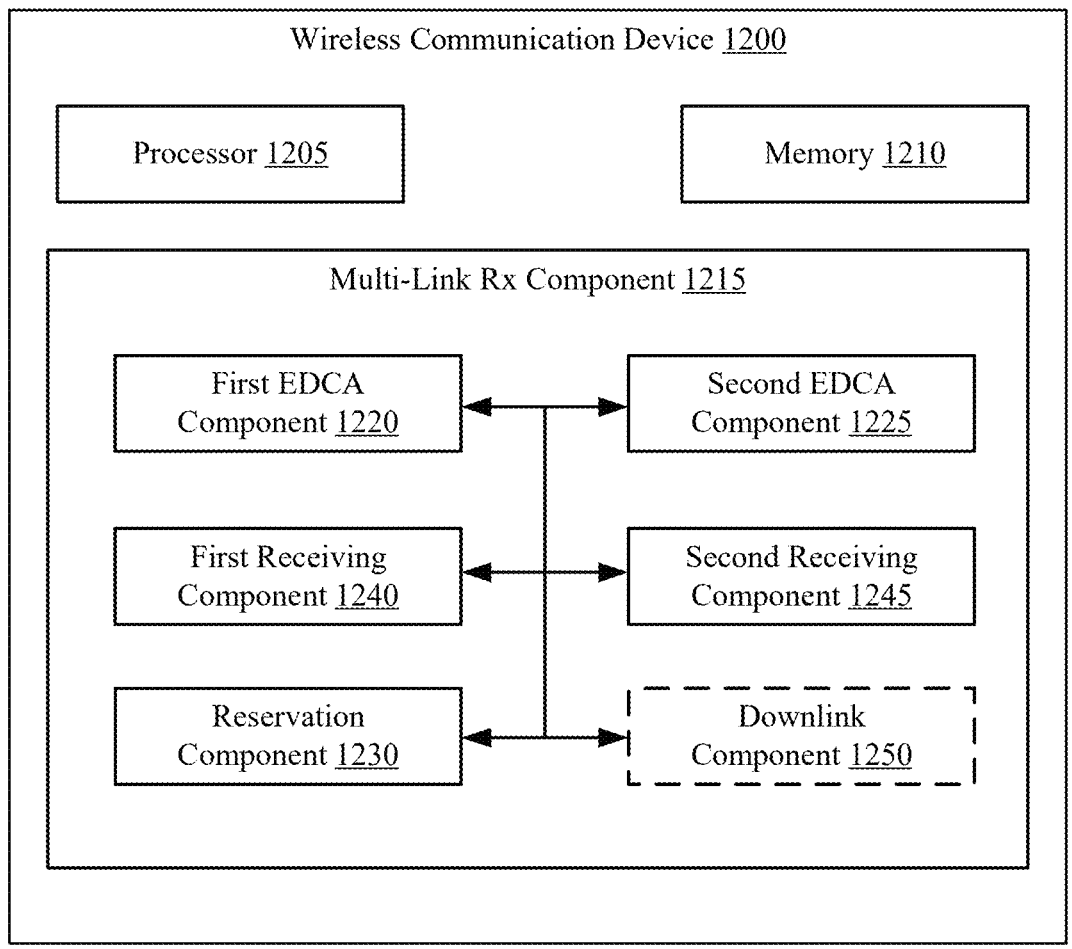
FIG. 12 shows a block diagram of an example wireless communication device.

FIG. 12 shows a block diagram of an example wireless communication device 1200. In some implementations, the wireless communication device 1200 is configured to perform the process described with reference to FIG. 13. The wireless communication device 1200 may be an example implementation of the wireless communication device 400 described with reference to FIG. 4. For example, the wireless communication device 1200 can be a chip, SoC, chipset, package or device that includes at least one processor and at least one modem (for example, a Wi-Fi (IEEE 802.11) modem or a cellular modem). In some implementations, the wireless communication device 1200 can be a device for use in an AP, such as one of the APs 102 and 502 described with reference to FIGS. 1 and 5A, respectively. In some other implementations, the wireless communication device 1200 can be an AP that includes such a chip, SoC, chipset, package or device as well as at least one transmitter, at least one receiver, and at least one antenna.

The wireless communication device 1200 includes a processor 1205 and a memory 1210. The wireless communication device 1200 may include a multi-link Rx component 1215, which may include, a first EDCA component 1220, a second EDCA component 1225, a reservation component 1230, a first receiving component 1240, a second receiving component 1245, and an optional downlink component 1250. Portions of one or more of the components 1215, 1220, 1225, 1230, 1240, 1245, and 1250 may be implemented at least in part in hardware or firmware. For example, the multi-link Rx component 1215 may be implemented at least in part by a modem (such as the modem 404). In some implementations, at least some of components 1215, 1220, 1225, 1230, 1240, 1245, and 1250 are implemented at least in part as software stored in a memory (such as the memory 408 or the memory 1210). For example, portions of one or more of the components 1215, 1220, 1225, 1230, 1240, 1245, and 1250 can be implemented as non-transitory instructions (or "code") executable by a processor (such as the processor 402 or the processor 1205) to perform the functions or operations of the respective module.

The first EDCA component 1220 is configured to advertise a first EDCA set including first EDCA parameters for a first link 616.

The second EDCA component 1225 is configured to advertise a second EDCA set including second EDCA parameters for a second link 626.

The reservation component 1230 is configured to receive a medium reservation message on the first link 616 reserving a TXOP for a station.

The first receiving component 1240 is configured to receive a first PPDU on the first link 616 during the TXOP and a second PPDU on the second link 626 during the TXOP.

The second receiving component 1245 is configured to receive a second PPDU on the second link 626 during the TXOP. A start time and an end time of the first PPDU and the second PPDU are aligned.

The downlink component 1250 is configured to refrain from transmitting a downlink PPDU on the second link 626 during the TXOP in response to the medium reservation message.

FIG. 13 shows a flowchart illustrating an example process 1300 for receiving PPDUs on multiple links. The operations of process 1300 may be implemented by an AP or its components as described herein. For example, the process 1300 may be performed by a wireless communication device such as the wireless communication device 400 described with reference to FIG. 4. In some implementations, the process 1300 may be performed by an AP, such as one of the APs 102 and 502 described with reference to FIGS. 1 and 5A, respectively.

In block 1302, the process 1300 includes advertising a first EDCA set including first EDCA parameters for a first link 616. For example, in an aspect, wireless communication device 1200, processor 1205, memory 1210, multi-link Rx component 1215, or first EDCA component 1220 may be configured to or may include means for advertising a first EDCA set including first EDCA parameters for a first link 616. For example, the first EDCA component 1220 may transmit a timing advertisement frame indicating the first EDCA set.

In block 1304, the process 1300 includes advertising a second EDCA set including second EDCA parameters for a second link 626. For example, in an aspect, wireless communication device 1200, processor 1205, memory 1210, multi-link Rx component 1215, or second EDCA component 1225 may be configured to or may include means for advertising a second EDCA set including second EDCA parameters for a second link 626. For example, the second EDCA component 1225 may transmit a timing advertisement frame indicating the second EDCA set.

In block 1306, the process 1300 optionally includes receiving a medium reservation message on the first link 616 reserving a TXOP for a station. For example, in an aspect, wireless communication device 1200, processor 1205, memory 1210, multi-link Rx component 1215, or reservation component 1230 may be configured to or may include means for receiving a medium reservation message 710 on the first link 616 reserving a TXOP 714 for a station. In some implementations, the medium reservation message is one of a CTS2Self message or a modified RTS message. In response to a modified RTS message, the reservation component 1230 may transmit a CTS message indicating the TXOP 714.

In block 1308, the process 1300 includes receiving a first physical protocol data unit (PPDU) on the first link 616 during the TXOP. For example, in an aspect, wireless communication device 1200, processor 1205, memory 1210, multi-link Rx component 1215, or first receiving component 1240 may be configured to or may include means for receiving a first PPDU 614 on the first link 616 during the TXOP 714.

In block 1310, the process 1300 includes receiving a second PPDU on the second link 626 during the TXOP. For example, in an aspect, wireless communication device 1200, processor 1205, memory 1210, multi-link Rx component 1215, or second receiving component 1245 may be configured to or may include means for receiving a second PPDU 624 on the second link 626 during the TXOP 714. A start time and an end time of the first PPDU and the second PPDU are aligned.

Figure 14:
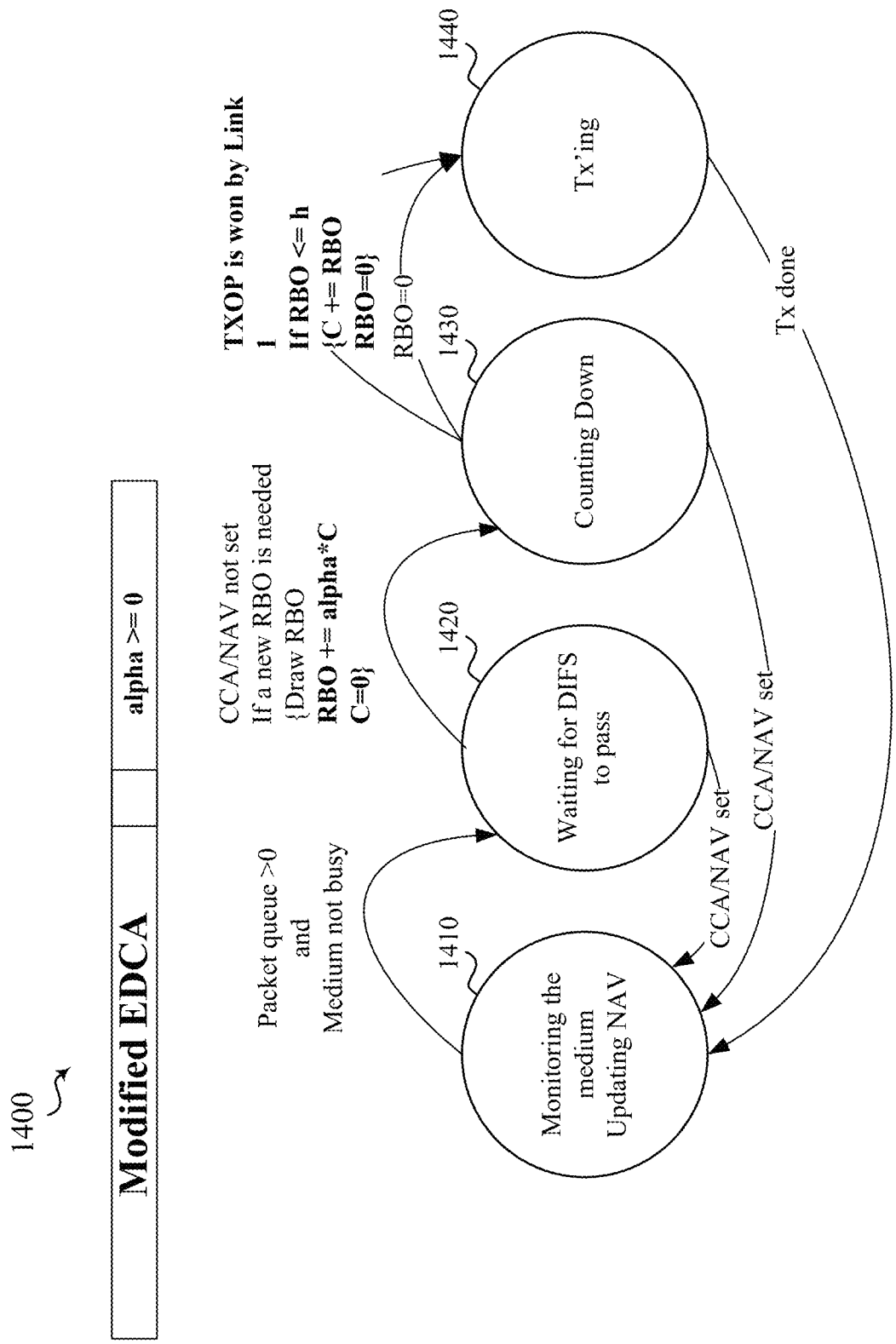
FIG. 14 shows an example state transition diagram including different states for a wireless device utilizing a credit-based enhanced distributed channel access (EDCA) mechanism.

FIG. 14 shows an example state transition diagram 1400 including different states for a wireless device utilizing a credit-based EDCA mechanism. In state 1410, the wireless device may monitor the medium and update a NAV. In state 1420, the wireless device may wait for a DIFS to pass. In state 1430, the wireless device may count down an RBO. In state 1440, the wireless device may transmit. The wireless device may transition from state 1410 to state 1420 when a packet queue had data (such as greater than 0) and the medium is not busy. The wireless device may transition from state 1420 to state 1430 when the DIFS has passed and CCA and NAV are not set. The wireless device may draw a new RBO. If the RBO adjustment component 950 did not previously set an RBO to 0, then the residual value, c, may be 0. Otherwise, the residual value, c, may be equal to the previous RBO value. The wireless device may increase the new RBO by the residual value, c, times the weighting factor, alpha. The wireless device may transition from the state 1430 to the state 1440 when a TXOP is won by a link counting down to 0. If the RBO for another link is less than the threshold, h, the wireless device may set the RBO for the other link to 0 and store the remaining RBO for the other link as the residual value, c. The wireless device may transition from state 1440 to state 1410 when a transmission is finished. The wireless device may transition from either state 1420 or state 1430 when a CCA or NAV is set.

Some Further Example Clauses

Implementation examples are described in the following numbered clauses:

1. A method for wireless communication by a wireless communication device, comprising:
    determining that a first random back off (RBO) for a first channel of a first link has counted down to zero;
    determining, when the first RBO has counted down to zero, that a second RBO for a second channel of a second link has a count down remaining;
    determining whether to wait for the second RBO before transmitting on the first link; and
    transmitting at least a first physical protocol data unit (PPDU) on the first link during a transmission opportunity (TXOP) that starts when the first RBO has counted down to zero.
2. The method of clause 1, further comprising:
    determining that the second RBO has counted down to zero in response to determining to wait for the second RBO; and
    transmitting a second PPDU on the second link, wherein a start time and an end time of the first PPDU and the second PPDU are aligned.
3. The method of clause 1 or 2, further comprising transmitting a medium reservation message on the first link reserving the TXOP.
4. The method of clause 3, wherein the medium reservation message is one of a clear to send to self (CTS2Self) message or a modified request to send (RTS) message.
5. The method of clause 3 or 4, wherein the medium reservation message interrupts the second RBO for the second link, further comprising resuming the second RBO after the medium reservation message.
6. The method of any of clauses 3-5, wherein determining whether to wait for the second RBO before transmitting on the first link is based on a probability of accessing the second link and an idle period on the first link between the medium reservation message and an expected availability of the second link.
7. The method of any of clauses 3-6, wherein an access point (AP) refrains from transmitting a downlink PPDU on the second link during the TXOP in response to the medium reservation message.
8. The method of any of clauses 3-7, wherein an access point for the second link advertises an enhanced distributed channel access (EDCA) set including second-phase EDCA parameters, further comprising adjusting the second RBO based on the second-phase EDCA parameters in response to transmitting the medium reservation message.
9. The method of any of clauses 1 or 3-8, wherein determining whether to wait for the second RBO before transmitting on the first link includes determining to transmit the first PPDU without waiting in response to determining that the second RBO is greater than a threshold.
10. The method of any of clauses 1 or 3-8, wherein determining whether to wait for the second RBO before transmitting on the first link includes determining to transmit the first PPDU without waiting in response to determining that the second channel is blocked by a network allocation vector (NAV).
11. The method of any of clauses 1 or 3-8, wherein determining whether to wait for the second RBO before transmitting on the first link includes: determining to wait for the second RBO before transmitting on the first link; and determining to transmit on the first link without waiting in response to determining that the second link is blocked.
12. The method of clause 11, wherein determining that the second link is blocked includes determining that a waiting time has expired.
13. The method of any of clauses 1-12, wherein the first RBO and the second RBO are initialized with a same value.
14. The method of clause 1, further comprising:
    determining that the count down remaining of the second RBO is less than a threshold; and
    setting the count down remaining of the second RBO to zero when the second channel is idle.
15. The method of clause 14, further comprising:
    selecting a new RBO for the second channel of the second link; and increasing the new RBO based on a residual value of the second RBO.
16. The method of clause 15, wherein increasing the new RBO based on the residual value of the second RBO comprises increasing the new RBO by the residual value multiplied by a configurable weighting factor.
17. The method of clause 1, further comprising:
    adding an offset to the first RBO and to the second RBO based on a configurable weighting factor, wherein transmitting at least the first PPDU on the first link during the TXOP comprises transmitting the first PPDU on the first link and transmitting a second PPDU on the second link in response to determining that either the first RBO or the second RBO has counted down to zero, wherein a start time and an end time of the first PPDU and the second PPDU are aligned.
18. The method of clause 1, wherein determining whether to wait for the second RBO before transmitting on the first link includes:
    determining to wait for the second RBO before transmitting on the first link;
    resetting the first RBO in response to another device using the first channel; and
    waiting for the first RBO and the second RBO to count down to zero.
19. The method of clause 18, wherein resetting the first RBO includes setting a value of the first RBO based on the count down remaining of the second RBO.
20. A method of wireless communication by a wireless access point (AP), comprising:
    advertising a first enhanced distributed channel access (EDCA) set including first EDCA parameters for a first link;
    advertising a second EDCA set including second EDCA parameters for a second link;
    receiving a first physical protocol data unit (PPDU) from a station on the first link during a transmission opportunity (TXOP); and
    receiving a second PPDU from the station on the second link during the TXOP, wherein a start time and an end time of the first PPDU and the second PPDU are aligned.
21. The method of clause 20, further comprising receiving a medium reservation message on the first link reserving the TXOP for the station.

22. The method of clause 21, wherein the medium reservation message is one of a clear to send to self (CTS2Self) message or a modified request to send (RTS) message.

23. The method of clause 21 or 22, further comprising refraining from transmitting a downlink PPDU on the second link during the TXOP in response to the medium reservation message.

24. The method of any of clauses 20-23, wherein the second EDCA set includes first phase EDCA parameters to be used when a station has not grasped another channel and second-phase EDCA parameters to be used when the station has grasped another channel, wherein a random back off (RBO) range for the second-phase EDCA parameters includes values less than a RBO range for the first-phase EDCA parameters.

25. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
determine that a first random back off (RBO) for a first channel of a first link has counted down to zero;
determine, when the first RBO has counted down to zero, that a second RBO for a second channel of a second link has a count down remaining;
determine whether to wait for the second RBO before transmitting on the first link; and
transmit at least a first physical protocol data unit (PPDU) on the first link during a transmission opportunity (TXOP) that starts when the first RBO has counted down to zero.

26. The wireless communication device of clause 25, wherein the processor-readable code is configured to:
determine that the second RBO has counted down to zero in response to determining to wait for the second RBO; and
transmit a second PPDU on the second link, wherein a start time and an end time of the first PPDU and the second PPDU are aligned.

27. The wireless communication device of clause 25, wherein the processor-readable code is configured to transmit a medium reservation message on the first link reserving the TXOP.

28. The wireless communication device of clause 27, wherein the medium reservation message is one of a clear to send to self (CTS2Self) message or a modified request to send (RTS) message.

29. The wireless communication device of clause 27 or 28, wherein the medium reservation message interrupts the second RBO for the second link, further comprising resuming the second RBO after the medium reservation message.

30. The wireless communication device of clause 27 or 28, wherein the processor-readable code configured to determine whether to wait for the second RBO before transmitting on the first link is based on a probability of accessing the second link and an idle period on the first link between the medium reservation message and an expected availability of the second link.

31. The wireless communication device of clause 27, wherein an access point refrains from transmitting a downlink PPDU on the second link during the TXOP in response to the medium reservation message.

32. The wireless communication device of any of clauses 27-31, wherein an access point for the second link advertises an enhanced distributed channel access (EDCA) set including second-phase EDCA parameters, further comprising adjusting the second RBO based on the second-phase EDCA parameters in response to transmitting the medium reservation message.

33. The wireless communication device of any of clauses 27-32, wherein the processor readable code to determine whether to wait for the second RBO before transmitting on the first link includes processor-readable code to determine to transmit the first PPDU without waiting in response to determining that the second RBO is greater than a threshold.

34. The wireless communication device of any of clauses 27 or 29-33, wherein the processor readable code to determine whether to wait for the second RBO before transmitting on the first link includes processor-readable code to transmit the first PPDU without waiting in response to determining that the second channel is blocked by a network allocation vector (NAV).

35. The wireless communication device of any of clauses 27 or 29-34, wherein the processor readable code to determine whether to wait for the second RBO before transmitting on the first link includes processor readable code to:
determine to wait for the second RBO before transmitting on the first link; and
determine to transmit on the first link without waiting in response to determining that the second link is blocked.

36. The wireless communication device of clause 35, wherein the processor readable code to determine that the second link is blocked includes the processor readable code to determine that a waiting time has expired.

37. The wireless communication device of any of clauses 27-36, wherein the first RBO and the second RBO are initialized with a same value.

38. The wireless communication device of clause 25, wherein the processor-readable code is configured to:
determine that the count down remaining of the second RBO is less than a threshold; and
set the count down remaining of the second RBO to zero when the second channel is idle.

39. The wireless communication device of clause 38, wherein the processor-readable code is configured to:
select a new RBO for the second channel of the second link; and
increase the new RBO based on a residual value of the second RBO.

40. The wireless communication device of clause 39, wherein the processor readable code to increase the new RBO based on the residual value of the second RBO comprises processor readable code to increase the new RBO by the residual value multiplied by a configurable weighting factor.

41. The wireless communication device of clause 25, wherein the processor readable code is configured to:
add an offset to the first RBO and to the second RBO based on a configurable weighting factor, wherein the processor readable code to transmit at least the first PPDU on the first link during the TXOP comprises processor readable code to transmit the first PPDU on the first link and transmit a second PPDU on the second link in response to determining that either the first RBO or the second RBO has counted down to zero, wherein a start time and an end time of the first PPDU and the second PPDU are aligned.

42. The wireless communication device of clause 25, wherein the processor readable code is configured to: determine to wait for the second RBO before transmitting on the first link; reset the first RBO in response to another device using the first channel; and wait for the first RBO and the second RBO to count down to zero.

43. The wireless communication device of clause 42, wherein the processor readable code is configured to set a value of the first RBO based on the count down remaining of the second RBO.

44. A wireless access point, comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
advertise a first enhanced distributed channel access (EDCA) set including first EDCA parameters for a first link;
advertise a second EDCA set including second EDCA parameters for a second link;
receive a first physical protocol data unit (PPDU) from a station on the first link during a transmission opportunity (TXOP); and
receive a second PPDU from the station on the second link during the TXOP, wherein a start time and an end time of the first PPDU and the second PPDU are aligned.

45. The wireless access point of clause 44, wherein the processor-readable code is configured to receive a medium reservation message on the first link reserving the TXOP for the station.

46. The wireless access point of clause 45, wherein the medium reservation message is one of a clear to send to self (CTS2Self) message or a modified request to send (RTS) message.

47. The wireless access point of clause 45 or 46, wherein the processor-readable code is configured to refrain from transmitting a downlink PPDU on the second link during the TXOP in response to the medium reservation message.

48. The wireless access point of any of clauses 44-47, wherein the second EDCA set includes first phase EDCA parameters to be used when a station has not grasped another channel and second-phase EDCA parameters to be used when the station has grasped another channel, wherein a random back off (RBO) range for the second-phase EDCA parameters includes values less than a RBO range for the first-phase EDCA parameters.

49. An apparatus for wireless communication by a wireless communication device, comprising:
means for determining that a first random back off (RBO) for a first channel of a first link has counted down to zero;
means for determining, when the first RBO has counted down to zero, that a second RBO for a second channel of a second link has a count down remaining;
means for determining whether to wait for the second RBO before transmitting on the first link; and
means for transmitting at least a first physical protocol data unit (PPDU) on the first link during a transmission opportunity (TXOP) that starts when the first RBO has counted down to zero.

50. The apparatus of clause 49, further comprising:
means for determining that the second RBO has counted down to zero in response to determining to wait for the second RBO; and means for transmitting a second PPDU on the second link, wherein a start time and an end time of the first PPDU and the second PPDU are aligned.

51. The apparatus of clause 49 or 50, further comprising means for transmitting a medium reservation message on the first link reserving the TXOP.

52. The apparatus of clause 51, wherein the medium reservation message is one of a clear to send to self (CTS2Self) message or a modified request to send (RTS) message.

53. The apparatus of clause 51 or 52, wherein the medium reservation message interrupts the second RBO for the second link, further comprising resuming the second RBO after the medium reservation message.

54. The apparatus of any of clauses 51-53, wherein the means for determining whether to wait for the second RBO before transmitting on the first link is based on a probability of accessing the second link and an idle period on the first link between the medium reservation message and an expected availability of the second link.

55. The apparatus of any of clauses 51-54, wherein an access point refrains from transmitting a downlink PPDU on the second link during the TXOP in response to the medium reservation message.

56. The apparatus of any of clauses 51-55, wherein an access point for the second link advertises an enhanced distributed channel access (EDCA) set including second-phase EDCA parameters, further comprising means for adjusting the second RBO based on the second-phase EDCA parameters in response to transmitting the medium reservation message.

57. The apparatus of any of clauses 49 or 51-56, wherein the means for determining whether to wait for the second RBO before transmitting on the first link is configured to determine to transmit the first PPDU without waiting in response to determining that the second RBO is greater than a threshold.

58. The apparatus of any of clauses 49 or 51-56, wherein the means for determining whether to wait for the second RBO before transmitting on the first link is configured to determine to transmit the first PPDU without waiting in response to determining that the second channel is blocked by a network allocation vector (NAV).

59. The apparatus of any of clauses 49 or 51-56, wherein the means for determining whether to wait for the second RBO before transmitting on the first link is configured to:
determine to wait for the second RBO before transmitting on the first link; and
determine to transmit on the first link without waiting in response to determining that the second link is blocked.

60. The apparatus of clause 59, wherein the means for determining that the second link is blocked is configured to determine that a waiting time has expired.

61. The apparatus of any of clauses 49 or 60, wherein the first RBO and the second RBO are initialized with a same value.

62. The apparatus of clause 49, further comprising:
means for determining that the count down remaining of the second RBO is less than a threshold; and
means for setting the count down remaining of the second RBO to zero when the second channel is idle.

63. The apparatus of clause 61, further comprising:
means for selecting a new RBO for the second channel of the second link; and
means for increasing the new RBO based on a residual value of the second RBO.

64. The apparatus of clause 63, wherein the means for increasing the new RBO based on the residual value of the second RBO is configured to increase the new RBO by the residual value multiplied by a configurable weighting factor.

65. The apparatus of clause 49, further comprising:
means for adding an offset to the first RBO and to the second RBO based on a configurable weighting factor, wherein transmitting at least the first PPDU on the first link during the TXOP comprises transmitting the first PPDU on the first link and transmitting a second PPDU on the second link in response to determining that either the first RBO or the second RBO has counted down to zero, wherein a start time and an end time of the first PPDU and the second PPDU are aligned.

66. The apparatus of clause 49, wherein the means for determining whether to wait for the second RBO before transmitting on the first link is configured to: determine to wait for the second RBO before transmitting on the first link; reset the first RBO in response to another device using the first channel; and wait for the first RBO and the second RBO to count down to zero.

67. The apparatus of clause 49, wherein the means for determining whether to wait for the second RBO before transmitting on the first link is configured to set a value of the first RBO based on the count down remaining of the second RBO.

68. A apparatus of wireless communication by a wireless access point, comprising:
means for advertising a first enhanced distributed channel access (EDCA) set including first EDCA parameters for a first link;
means for advertising a second EDCA set including second EDCA parameters for a second link;
means for receiving a first physical protocol data unit (PPDU) from a station on the first link during a transmission opportunity (TXOP); and
means for receiving a second PPDU from the station on the second link during the TXOP, wherein a start time and an end time of the first PPDU and the second PPDU are aligned.

69. The apparatus of clause 68, further comprising means for receiving a medium reservation message on the first link reserving the TXOP for the station.

70. The apparatus of clause 69, wherein the medium reservation message is one of a clear to send to self (CTS2Self) message or a modified request to send (RTS) message.

71. The apparatus of clause 69 or 70, further comprising means for refraining from transmitting a downlink PPDU on the second link during the TXOP in response to the medium reservation message.

72. The apparatus of any of clauses 68-71, wherein the second EDCA set includes first phase EDCA parameters to be used when a station has not grasped another channel and second-phase EDCA parameters to be used when the station has grasped another channel, wherein a random back off (RBO) range for the second-phase EDCA parameters includes values less than a RBO range for the first-phase EDCA parameters.

73. A non-transitory computer-readable medium comprising stored instructions for wireless communication by a wireless communication device, executable by a processor to:
determine that a first random back off (RBO) for a first channel of a first link has counted down to zero;
determine, when the first RBO has counted down to zero, that a second RBO for a second channel of a second link has a count down remaining;
determine whether to wait for the second RBO before transmitting on the first link; and
transmit at least a first physical protocol data unit (PPDU) on the first link during a transmission opportunity (TXOP) that starts when the first RBO has counted down to zero.

74. The non-transitory computer-readable medium of clause 73, wherein the stored instructions include instructions to:
determine that the second RBO has counted down to zero in response to determining to wait for the second RBO; and
transmit a second PPDU on the second link, wherein a start time and an end time of the first PPDU and the second PPDU are aligned.

75. The non-transitory computer-readable medium of clause 73 or 74, wherein the stored instructions include instructions to transmit a medium reservation message on the first link reserving the TXOP.

76. The non-transitory computer-readable medium of clause 75, wherein the medium reservation message is one of a clear to send to self (CTS2Self) message or a modified request to send (RTS) message.

77. The non-transitory computer-readable medium of clause 75 or 76, wherein the medium reservation message interrupts the second RBO for the second link, further comprising resuming the second RBO after the medium reservation message.

78. The non-transitory computer-readable medium of any of clauses 75-78, wherein the stored instructions to determine whether to wait for the second RBO before transmitting on the first link is based on a probability of accessing the second link and an idle period on the first link between the medium reservation message and an expected availability of the second link.

79. The non-transitory computer-readable medium of any of clauses 75-79, wherein an access point refrains from transmitting a downlink PPDU on the second link during the TXOP in response to the medium reservation message.

80. The non-transitory computer-readable medium of any of clauses 75-79, wherein an access point for the second link advertises an enhanced distributed channel access (EDCA) set including second-phase EDCA parameters, further comprising stored instructions to adjust the second RBO based on the second-phase EDCA parameters in response to transmitting the medium reservation message.

81. The non-transitory computer-readable medium of any of clauses 73 or 75-80, wherein the stored instructions to determine whether to wait for the second RBO before transmitting on the first link includes stored instructions to determine to transmit the first PPDU without waiting in response to determining that the second RBO is greater than a threshold.

82. The non-transitory computer-readable medium of any of clauses 73 or 75-80, wherein the stored instructions to determine whether to wait for the second RBO before transmitting on the first link includes stored instructions to transmit the first PPDU without waiting in response to determining that the second channel is blocked by a network allocation vector (NAV).

83. The non-transitory computer-readable medium of any of clauses 73 or 75-80, wherein the stored instructions to determine whether to wait for the second RBO before transmitting on the first link include stored instructions to:
determine to wait for the second RBO before transmitting on the first link; and
determine to transmit on the first link without waiting in response to determining that the second link is blocked.

84. The non-transitory computer-readable medium of clause 83, wherein the stored instructions to determine that the second link is blocked include stored instructions to determine that a waiting time has expired.

85. The non-transitory computer-readable medium of any of clauses 73-84, wherein the first RBO and the second RBO are initialized with a same value.

86. The non-transitory computer-readable medium of clause 73, wherein the stored instructions include instructions to:
determine that the count down remaining of the second RBO is less than a threshold; and
set the count down remaining of the second RBO to zero when the second channel is idle.

87. The non-transitory computer-readable medium of clause 86, wherein the stored instructions include instructions to:
select a new RBO for the second channel of the second link; and
increase the new RBO based on a residual value of the second RBO.

88. The non-transitory computer-readable medium of clause 87, wherein the stored instructions to increase the new RBO based on the residual value of the second RBO include stored instructions to increase the new RBO by the residual value multiplied by a configurable weighting factor.

89. The non-transitory computer-readable medium of clause 73, wherein the stored instructions include instructions to:
add an offset to the first RBO and to the second RBO based on a configurable weighting factor, wherein the stored instructions to transmit at least the first PPDU on the first link during the TXOP include instructions to transmit the first PPDU on the first link and transmit a second PPDU on the second link in response to determining that either the first RBO or the second RBO has counted down to zero, wherein a start time and an end time of the first PPDU and the second PPDU are aligned.

90. The non-transitory computer-readable medium of clause 73, wherein the stored instructions include instructions to:
determine to wait for the second RBO before transmitting on the first link;
reset the first RBO in response to another device using the first channel; and
wait for the first RBO and the second RBO to count down to zero.

91. The non-transitory computer-readable medium of clause 76, wherein the stored instructions include instructions to set a value of the first RBO based on the count down remaining of the second RBO.

92. A non-transitory computer-readable medium comprising stored instructions for wireless communication by a wireless access point, executable by a processor to:
advertise a first enhanced distributed channel access (EDCA) set including first EDCA parameters for a first link;
advertise a second EDCA set including second EDCA parameters for a second link;
receive a first physical protocol data unit (PPDU) from a station on the first link during a transmission opportunity (TXOP); and
receive a second PPDU from the station on the second link during the TXOP, wherein a start time and an end time of the first PPDU and the second PPDU are aligned.

93. The non-transitory computer-readable medium of clause 92, wherein the stored instructions are configured to receive a medium reservation message on the first link reserving the TXOP for the station.

94. The non-transitory computer-readable medium of clause 93, wherein the medium reservation message is one of a clear to send to self (CTS2Self) message or a modified request to send (RTS) message.

95. The non-transitory computer-readable medium of clause 93 or 94, wherein the stored instructions are configured to refrain from transmitting a downlink PPDU on the second link during the TXOP in response to the medium reservation message.

96. The non-transitory computer-readable medium of any of clauses 92-95, wherein the second EDCA set includes first phase EDCA parameters to be used when a station has not grasped another channel and second-phase EDCA parameters to be used when the station has grasped another channel, wherein a random back off (RBO) range for the second-phase EDCA parameters includes values less than a RBO range for the first-phase EDCA parameters.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
   determining that a first random back off (RBO) for a first channel of a first link has counted down to zero;
   determining, when the first RBO has counted down to zero, that a second RBO for a second channel of a second link has a count down remaining;
   determining to wait for the second RBO before transmitting on the first link, wherein determining to wait for the second RBO before transmitting on the first link includes:
      resetting the first RBO to a new value in response to another device using the first channel; and
      waiting for the first RBO and the second RBO to count down to zero after resetting the first RBO;
   determining that the second RBO has counted down to zero; and
   transmitting at least a first physical protocol data unit (PPDU) on the first link during a transmission opportunity (TXOP) that starts when the first RBO has counted down to zero.

2. The method of claim 1, further comprising:
   transmitting a second PPDU on the second link, wherein a start time of the first PPDU and the second PPDU is aligned.

3. The method of claim 1, further comprising transmitting a medium reservation message on the first link reserving the TXOP.

4. The method of claim 3, wherein the medium reservation message is one of a clear to send to self (CTS2Self) message or a modified request to send (RTS) message.

5. The method of claim 3, wherein the medium reservation message interrupts the second RBO for the second link, further comprising resuming the second RBO after the medium reservation message.

6. The method of claim 1, wherein determining to wait for the second RBO before transmitting on the first link is based on a probability of accessing the second link estimated based on the second RBO.

7. The method of claim 1, wherein an access point (AP) refrains from transmitting a downlink PPDU on the second link during the TXOP in response to the first PPDU on the first link.

8. The method of claim 3, wherein an access point for the second link advertises an enhanced distributed channel access (EDCA) set including second-phase EDCA parameters, further comprising adjusting the second RBO based on the second-phase EDCA parameters in response to transmitting the medium reservation message.

9. The method of claim 1, wherein determining to wait for the second RBO before transmitting on the first link includes determining to wait for the second RBO before transmitting on the first link in response to determining that the second RBO is less than a threshold.

10. The method of claim 1, wherein determining to wait for the second RBO before transmitting on the first link includes determining to wait for the second RBO before transmitting on the first link in response to determining that the second channel is not blocked by a network allocation vector (NAV).

11. The method of claim 1, further comprising determining to transmit on the first link without waiting in response to determining that the second link is blocked.

12. The method of claim 11, wherein determining that the second link is blocked includes determining that a waiting time has expired.

13. The method of claim 1, wherein the first RBO and the second RBO are initialized with a same value.

14. The method of claim 1, further comprising:
determining that the count down remaining of the second RBO is less than a threshold; and
setting the count down remaining of the second RBO to zero when the second channel is idle.

15. The method of claim 14, further comprising:
selecting a new RBO for the second channel of the second link; and
increasing the new RBO based on a residual value of the second RBO.

16. The method of claim 15, wherein increasing the new RBO based on the residual value of the second RBO comprises increasing the new RBO by the residual value multiplied by a configurable weighting factor.

17. The method of claim 1, further comprising:
adding an offset to the first RBO and to the second RBO based on a configurable weighting factor, wherein transmitting at least the first PPDU on the first link during the TXOP comprises transmitting the first PPDU on the first link and transmitting a second PPDU on the second link in response to determining that either the first RBO or the second RBO has counted down to zero, wherein a start time and an end time of the first PPDU and the second PPDU are aligned.

18. The method of claim 1, wherein resetting the first RBO includes setting the new value of the first RBO based on the count down remaining of the second RBO.

19. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
determine that a first random back off (RBO) for a first channel of a first link has counted down to zero;
determine, when the first RBO has counted down to zero, that a second RBO for a second channel of a second link has a count down remaining;
determine to wait for the second RBO before transmitting on the first link, wherein to wait for the second RBO before transmitting on the first link, the at least one processor is configured to:
reset the first RBO to a new value in response to another device using the first channel; and
wait for the first RBO and the second RBO to count down to zero after resetting the first RBO;
determine that the second RBO has counted down to zero; and
transmit at least a first physical protocol data unit (PPDU) on the first link during a transmission opportunity (TXOP) that starts when the first RBO has counted down to zero.

20. The wireless communication device of claim 19, wherein the processor-readable code is configured to:
transmit a second PPDU on the second link, wherein a start time of the first PPDU and the second PPDU is aligned.

21. The wireless communication device of claim 19, wherein the processor-readable code is configured to transmit a medium reservation message on the first link reserving the TXOP.

22. The wireless communication device of claim 21, wherein the medium reservation message is one of a clear to send to self (CTS2Self) message or a modified request to send (RTS) message.

23. The wireless communication device of claim 21, wherein the medium reservation message interrupts the second RBO for the second link, further comprising resuming the second RBO after the medium reservation message.

24. The method of claim 2, wherein an end time of the first PPDU and the second PPDU is aligned.

25. The wireless communication device of claim 20, wherein an end time of the first PPDU and the second PPDU is aligned.

* * * * *